(12) United States Patent
Vessels et al.

(10) Patent No.: US 11,886,578 B2
(45) Date of Patent: Jan. 30, 2024

(54) SYSTEMS AND METHODS FOR EMBEDDED ANOMALIES DETECTOR FOR CYBER-PHYSICAL SYSTEMS

(71) Applicant: Honeywell International Inc., Charlotte, NC (US)

(72) Inventors: Ly Vessels, Chandler, AZ (US); Darryl Busch, Eden Prairie, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 17 days.

(21) Appl. No.: 17/238,479

(22) Filed: Apr. 23, 2021

(65) Prior Publication Data

US 2021/0334370 A1 Oct. 28, 2021

Related U.S. Application Data

(60) Provisional application No. 63/014,792, filed on Apr. 24, 2020.

(51) Int. Cl.
| | |
|---|---|
| *G06F 21/55* | (2013.01) |
| *G06F 21/54* | (2013.01) |
| *G06F 21/56* | (2013.01) |
| *G06F 21/85* | (2013.01) |

(52) U.S. Cl.
CPC .......... *G06F 21/554* (2013.01); *G06F 21/54* (2013.01); *G06F 21/566* (2013.01); *G06F 21/85* (2013.01)

(58) Field of Classification Search
CPC ...... G06F 21/554; G06F 21/54; G06F 21/566; G06F 21/85; G06F 11/3452; G06F 11/3013; G06F 11/302; G06F 11/3466; G06F 21/55; G06F 21/552; G06F 21/577; H04L 43/16; H04L 41/064; H04L 41/147; H04L 41/149; H04L 41/16; H04L 63/1425

See application file for complete search history.

(56) References Cited

U.S. PATENT DOCUMENTS

| | | | |
|---|---|---|---|
| 2016/0371138 A1* | 12/2016 | Ricken | G06F 11/3495 |
| 2019/0253440 A1* | 8/2019 | Mathur | G05B 19/058 |
| 2019/0340392 A1* | 11/2019 | Khorrami | G06F 11/3612 |
| 2020/0175171 A1* | 6/2020 | Rieger | G06F 21/577 |
| 2020/0285738 A1* | 9/2020 | Tippenhauer | G06N 20/00 |
| 2020/0293657 A1* | 9/2020 | Chai | G06F 11/3452 |
| 2020/0322366 A1* | 10/2020 | Yan | G06N 3/0472 |

(Continued)

OTHER PUBLICATIONS

Raciti et al., Embedded Cyber-Physical Anomaly Detection in Smart Meters, 2013. (Year: 2013).*

(Continued)

*Primary Examiner* — Trong H Nguyen
(74) *Attorney, Agent, or Firm* — Lorenz & Kopf LLP

(57) ABSTRACT

Disclosed are methods, systems, and non-transitory computer-readable medium for detecting data anomalies on a device. The method may include determining data patterns for data input to the device, data output from the device, and/or data stored in a memory of the device; monitoring the data input, data output, and the data stored in the memory at least based on the determined data patterns in parallel with processing of the data input, data output, and/or the data stored in the memory; and detecting whether an anomaly exists in the data input, data output, and/or the data stored in the memory of the device based on the monitoring.

20 Claims, 15 Drawing Sheets

(56) References Cited

U.S. PATENT DOCUMENTS

2021/0089661 A1* 3/2021 Rieger ................ G06F 11/3466
2021/0097173 A1* 4/2021 Randall .............. G11C 13/0069

OTHER PUBLICATIONS

Extended European Search Report dated Sep. 16, 2021 in European Application No. 21170015.8 (8 pages).
Prashanth Krishnamurthy et al. "Anomaly Detection in Real-Time Multi-Threaded Processes Using Hardware Performance Counters", IEE Transactions on Information Forensics and Security, vol. 15, Sep. 23, 2019 (Sep. 23, 2019), Sep. 23, 2019 (Sep. 23, 2019), pp. 666-680, XP811747842.

* cited by examiner

SYSTEMS AND METHODS FOR EMBEDDED ANOMALIES DETECTOR FOR CYBER-PHYSICAL SYSTEMS

RELATED APPLICATIONS

This application claims priority to U.S. Provisional Application No. 63/014,792 filed Apr. 24, 2020, the entirety of which is hereby incorporated herein by reference.

TECHNICAL FIELD

Various embodiments of the present disclosure generally relate to security capabilities of cyber-physical systems (CPS), such as control systems on vehicles, ships, aircrafts, and industrial plants, etc.

BACKGROUND

Cyber-physical systems (CPS), such as control systems on vehicles, ships, aircraft, spacecraft, and industrial plants, may be potential targets for cyberattacks. These systems may include networked devices (e.g., controllers, sensors, actuators, etc.) with embedded computers that may be vulnerable to hacking. Existing technologies or technologies currently under development attempt to protect such systems from attack using, e.g., segregating networks, firewalls, access control, encryption, secure software updates, etc. Yet attackers continue to search for and find new holes in the security. Hence, there is a need for an improved method and system of security for CPS devices.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods disclosed relate to security capabilities of cyber-physical systems (CPS), such as control systems on vehicles, ships, aircrafts, and industrial plants, etc.

In one embodiment, a computer-implemented method is disclosed for detecting data anomalies on a device. The method may include determining, by one or more processors, data patterns for data input to the device, data output from the device, and/or data stored in a memory of the device; monitoring, by the one or more processors, the data input, data output, and the data stored in the memory at least based on the determined data patterns in parallel with processing of the data input, data output, and/or the data stored in the memory; and detecting, by the one or more processors, whether an anomaly exists in the data input, data output, and/or the data stored in the memory of the device based on the monitoring.

In one embodiment, a system for detecting data anomalies on a device is disclosed. The system may include a memory storing instructions; and a processor executing the instructions to perform a process. The process may include determining data patterns for data input to the device, data output from the device, and/or data stored in a memory of the device; monitoring the data input, data output, and the data stored in the memory at least based on the determined data patterns in parallel with processing of the data input, data output, and/or the data stored in the memory; and detecting whether an anomaly exists in the data input, data output, and/or the data stored in the memory of the device based on the monitoring.

In one embodiment, a non-transitory computer-readable medium is disclosed. The non-transitory computer-readable medium may store instructions that, when executed by a processor, cause the processor to perform a method for detecting data anomalies on a device. The method may include determining data patterns for data input to the device, data output from the device, and/or data stored in a memory of the device; monitoring the data input, data output, and the data stored in the memory at least based on the determined data patterns in parallel with processing of the data input, data output, and/or the data stored in the memory; and detecting whether an anomaly exists in the data input, data output, and/or the data stored in the memory of the device based on the monitoring.

In one embodiment, a computer-implemented method is disclosed for detecting data anomalies on a device. The method may include passively monitoring, by one or more processors, data input, data output, and/or predetermined internal variable in a memory of the device based on one or more predetermined attack patterns and/or one or more predetermined approved patterns; and detecting, by the one or more processors, data anomalies based on the passive monitoring.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
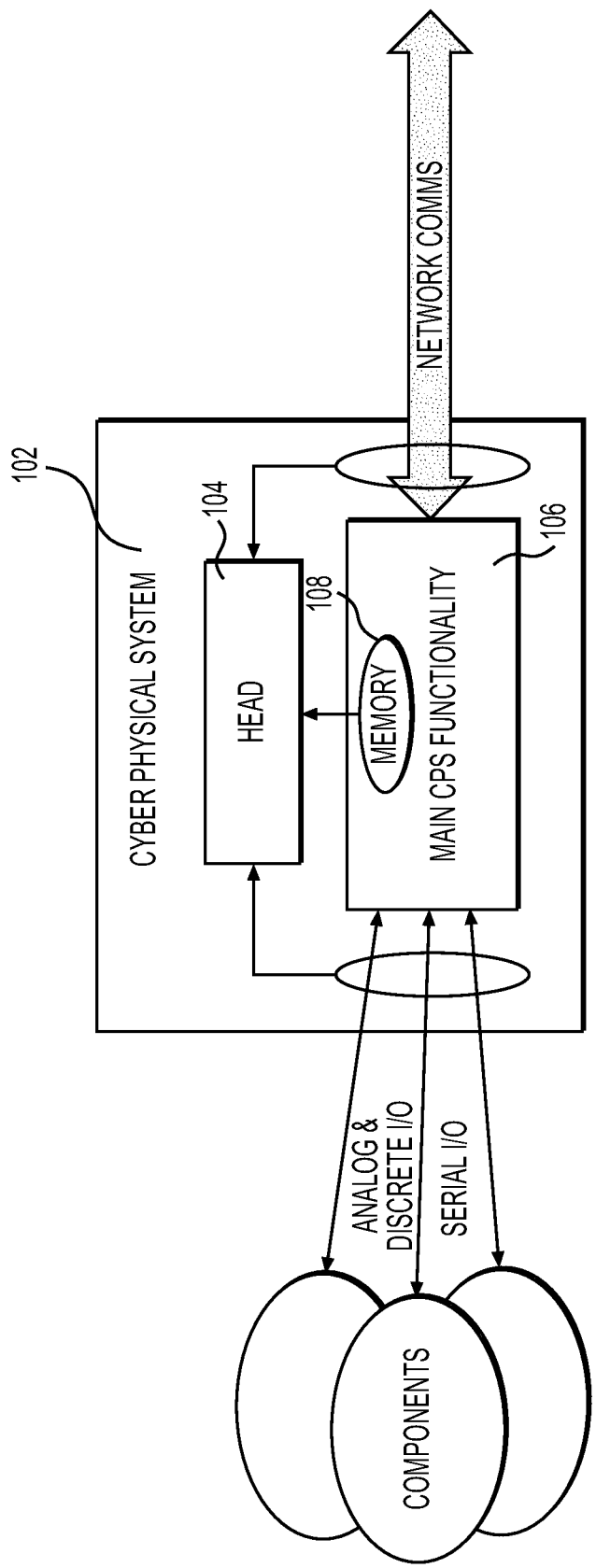
FIG. 1 depicts an example of an embedded anomalies detector (HEAD) embedded in a device according to some embodiments.

The following embodiments describe methods and systems for security capabilities of cyber-physical systems (CPS), such as control systems on vehicles, ships, aircrafts, and industrial plants, etc. As noted above, CPSs are potential targets for cyberattacks. CPS devices may include networked devices (controllers, sensors, actuators, etc.) with embedded computers that may be vulnerable to hacking. Hence, there is a need for an embedded layer of security for CPS devices that monitors for anomalous behavior indicative of a cyberattack in the CPS device and/or in systems that communicate with the CPS device.

As will be described in further detail below, the embodiments disclosed herein may add an additional layer of security by embedding security capability onto each CPS device configured to monitor for anomalous behavior indicative of a cyberattack in the CPS device and/or in the systems that communicate with the CPS device. In some embodiments, the additional layer of security to a CPS device may complement other layers of cyber-security of the CPS device.

Some embodiments disclosed herein may monitor for activity that may be indicative of a cyber-attack. Some existing layers of cyber-security for CPS devices may be layers of defense to prevent attackers from breaking into the system, e.g., of the CPS device. The embodiments disclosed herein may address instances in which an attacker has gotten through the existing layers of defense, as will be explained in further detail below.

Some embodiments disclosed herein may detect "known attacks" and "novel attacks." In the context of the current disclosure, the term "known attacks" may refer to one or more predicted attack patterns, attack patterns that have been previously observed, and/or any anticipated attack patterns. In the context of the current disclosure, the term "novel attacks" may refer to one or more attack patterns that have never been observed or anticipated. As will be described in further detail below, such known attacks and novel attacks may be detected utilizing a combination of attack pattern recognition and anomaly detection. In some embodiments, CPS device activity may be monitored, for example, network communications, analog and discrete input/outputs local to the CPS device, and one or more portions of CPS device memory.

Some CPS devices (e.g. actuators, smart sensors, etc.) may have minimal built in cyber-security. This may have been sufficient in the past, for example, assuming a plant including such CPS devices were inaccessible to attackers and thus adequately secured, but cannot be expected to work in the future due to increased connectivity.

Currently, the military requires systems to be assessed and authorized to NIST RMF medium robustness. Additionally, regulated industries (e.g., aviation) are adding security requirements to their certification requirement (e.g., Airworthiness Security requirements for aircraft). Furthermore, as commercial sectors grow in complexity to a connected world and space, cybersecurity assurance systems may become a quintessential requirement in constructing and maintaining cyber-physical systems. Such cybersecurity requirements may change the way products and/or solutions are generated. For example, an approach may be to develop security products and/or solutions to augment current products and/or solutions. Some embodiments disclosed herein provide a security product-line for cyber-physical systems, e.g., CPS devices. Such security product-line for cyber-physical systems may be necessary for continued use of current products and/or solutions in the world of connectedness where cybersecurity is crucial.

As will be described in further detail below, embodiments disclosed herein may be directed to an embedded anomalies detector (hereinafter referred to as "HEAD"). The HEAD may be embedded software located on a CPS device (e.g. an actuator on an aircraft carrier) that monitors the CPS device for cyberattacks. The HEAD may be an additional layer of security in an overall cybersecurity offering for the CPS device. While many of the other security layers may be lines of defense intended to prevent attackers from breaking into the system, the HEAD may be a last line of defense that detects that an attacker has nevertheless gotten through.

In some embodiments, the HEAD may utilize one or more customized detection algorithms that require minimal compute footprint (e.g. less than 50 kB of memory) that enables the HEAD to fit within the limited compute resources of a CPS device.

Some advantages provided by the embodiments disclosed herein may include, but not limited to, the following:

(1) A purpose-built set of lean algorithms that may allow a minimal computational footprint (e.g., less than 50 kB of RAM) and may operate with or without an operating system (OS). Some embodiments may run on the same compute platform as the main functionality of the CPS device. This may make it suitable for small and low cost devices, and for CPS devices that require certification and thus prefer fewer lines of code.

(2) Each individual algorithm may be unique compared to conventional methods and systems.

(3) Some embodiments disclosed herein may monitor multiple sources of information including, but not restricted to, (i) network communication in and out of the CPS device; (ii) discrete and analog I/O with non-network devices connected to the CPS device; and (iii) select volatile and non-volatile memory locations in the CPS device that contain information about the operation of main functions of the CPS device, including state information, intermediate results, sensor values, command values, configuration parameters, etc.

(4) Some embodiments disclosed herein may combine anomaly detection by allowing the detection of novel attacks that were never seen before with pattern recognition and allowing the detection of known attack. In some embodiments, a one or more algorithms, as described in further detail below, may be operated simultaneously. Some algorithms may be anomaly detectors, which define boundaries for normal behavior, and alert when the behavior is out of bounds. Some algorithms may be based on pattern recognition, which may detect pre-defined sequences of activity associated with known forms of attack. The one or more algorithms may include single variable and multivariate algorithms.

(5) Some embodiments disclosed herein may be applied to a CPS device, e.g., a marine actuator, with a secure communication network connection that must be monitored, and where the actuator may include line-replaceable units (LRUs), e.g., motor, sensors, etc., with internal discrete analog and discrete I/O connections that must also be monitored. Accordingly, the secure communication network connection, discrete analog and/or discrete I/O connections may be monitored.

FIG. 1 depicts an example of a HEAD 104 embedded in a CPS device 102 according to some embodiments. As shown in FIG. 1, the HEAD 104 may coexist with the main software 106 of the CPS device 102 that performs the primary functionality of the CPS device 102. The HEAD 104 may run in the same executable as the main software 106, a separate executable on the same core, and/or on a separate core. The HEAD 104 may monitor the activity of the main software 106 for anomalous behavior indicative of a cyberattack by passively monitoring the inputs and outputs (I/O) of the CPS device 102, and one or more internal variables in the CPS device 102 memory 108. For example, inputs, outputs, and one or more internal variable in the memory 108 may include the following: network messages that carry commands and responses; analog, discrete and serial I/O to and from the CPS device 102 (e.g., motor drive current, motor position sensor, temperature sensor, actuator position sensor, etc.); and internal variables and settings in memory 108 such as configuration settings, current mode of operation, control loop input and output variables, and health state.

In some embodiments, the HEAD 104 may determine and utilize one or more lists of data patterns to determine known and/or novel attacks. For example, the HEAD 104 may generate or receive one or more lists of data patterns to detect known and/or novel attacks. In some embodiments, the HEAD 104 may detect new forms of attacks based on a detection of anomalous behavior based on the one or more lists of data patterns. In some embodiments, the one or more lists may include a white list (also referred to as allow-listing) of patterns that explicitly allow the listed one or more data patterns. For example, the white list of data patterns for the CPS device 102, e.g., an actuator, may include: constraints on all aspects of a specified interface and serial interface, constraints on value domain for analog and discrete signals, constraints on rates of change for analog signals, constraints on the multi-variate correlations between signals and/or derivatives of signals, constraints on the allowed transitions and chatter rates for discrete signals, etc. In some embodiments, the HEAD 104 may detect new forms of attacks, i.e., novel attacks, based on detected attack patterns that deviate from the data patterns listed in the white list.

In some embodiments, the one or more lists may include a black list (also referred to as a block list or deny list) of data patterns that correspond to known attacks. For example, the black list of data patterns for the CPS device 102 may include: sequences of high rate open and close commands that would cause the motor to overheat, patterns of open and close commands that have negative effects on other ship systems, etc.

The HEAD 104 may log and report detected data patterns. In some embodiments, data patterns detected by the HEAD 104 are logged and reported. For example, when the HEAD 104 detects a cyber event, e.g., detects a data pattern corresponding to a known or novel attack, the HEAD 104 may log details of the event internally, and generate and transmit a summary report of the event to a secure access server, e.g., secure access smart hub (SASH). The secure access server may forward the message to platform-level security services. The platform-level security services may then details of the event if needed by requesting additional information from the HEAD 104.

A system architecture description of the HEAD 104 is provided in further detail below. It is understood that the HEAD 104 is not restricted to the description provided below and that there may be variations to the HEAD 104 in alternative embodiments.

In some embodiments, the HEAD 104 include one or more software components that is located within and executes inside the CPS device 102. The HEAD 104 may monitor the CPS device 102 for security anomalies and send an alert when an anomaly is detected.

Figure 2:
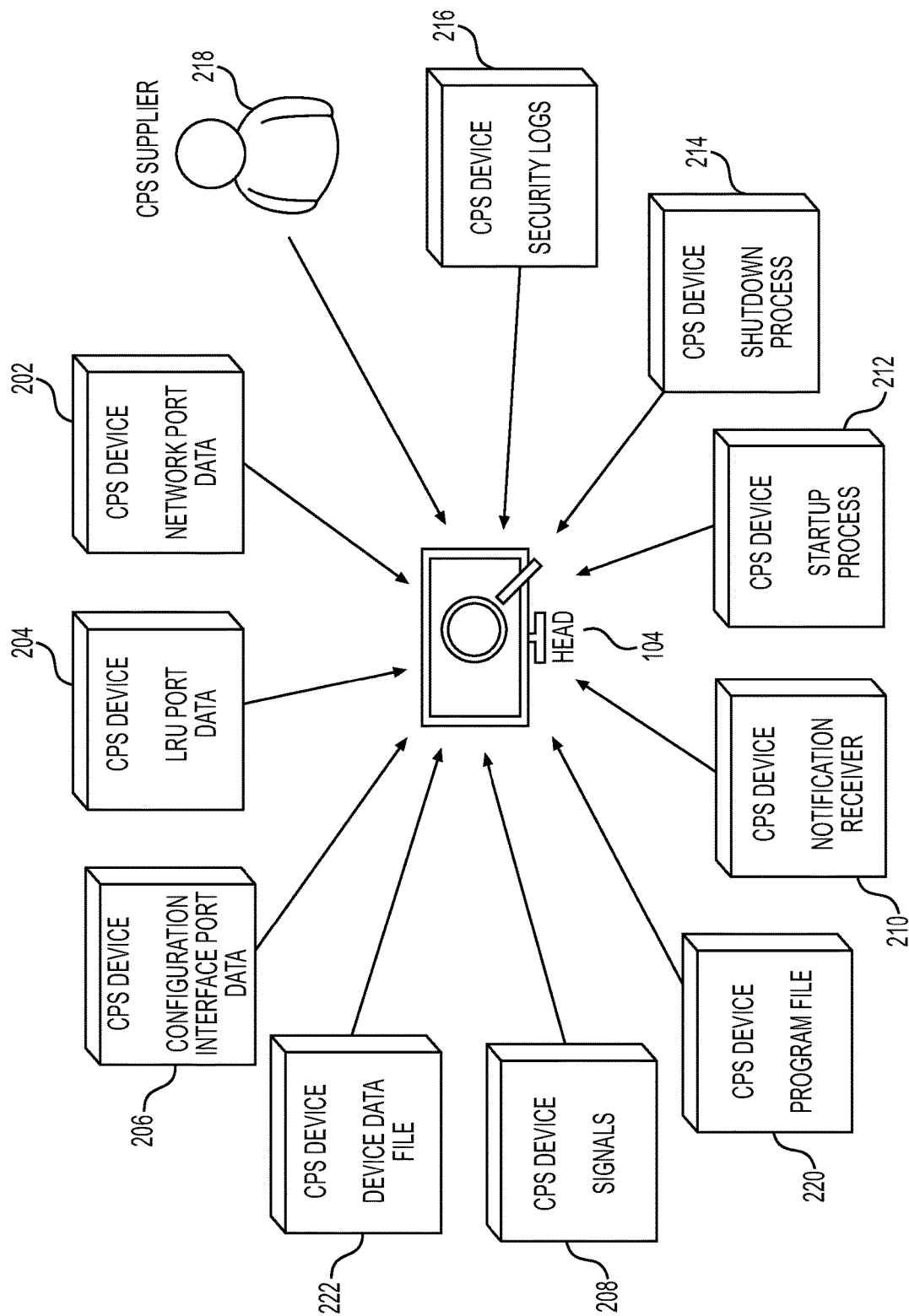
FIG. 2 depicts an example embodiment of the HEAD according to some embodiments.

FIG. 2 depicts an example embodiment of the HEAD 104 according to some embodiments. As shown in FIG. 2, the HEAD 104 may provide the following non-limiting capabilities: (i) monitor network port communications 202 of the CPS device 102 for anomalous behavior (e.g., novel attacks), data, and known attacks, (ii) monitor LRU port communications 204 for anomalous behavior, data, and known attacks, (iii) monitor configuration port communications 206 for anomalous behavior, data, and known attacks, (iv) monitor the behavior of programs in operation on the CPS device 102 via, for example, CPS device signals 208, (v) send security notifications 210 to a recipient, e.g., the recipient specified in a configuration file, (vi) send regular "alive" confirmations to the recipient specified in the configuration file, and (vii) learn and improve over time through analytics and configuration updates. As shown in FIG. 2, the CPS device 102 may initiate a startup process to startup 212 the HEAD 104. Similarly, the CPS device 102 may initiate a shutdown process to shutdown 214 the HEAD 104. The CPS device 102 may also write security logs 216 on the HEAD 104. In some embodiments, the HEAD 104 may provide sufficient security to satisfy NIST SP 800-53 requirement to achieve NIST RMF assessment and authorization medium robustness certification.

The HEAD 104 may include one or more software components located in the CPS device 102 to detect security anomalies in the CPS device 102 and issue notifications upon detection of such security anomalies. Due to the constraints of computing resources of typical CPS devices, the HEAD 104 may learn and detect security anomalies off-line, e.g., without connection to a computing server, based on a collection of data. The knowledge learned by the HEAD 104 may be used to develop small algorithms that are deployed on the CPS device 102 to monitor the data for security anomalies. In some alternative embodiments, the HEAD 104 may be realized by sole Artificial Intelligence to learn and detect security anomalies.

Figure 3:
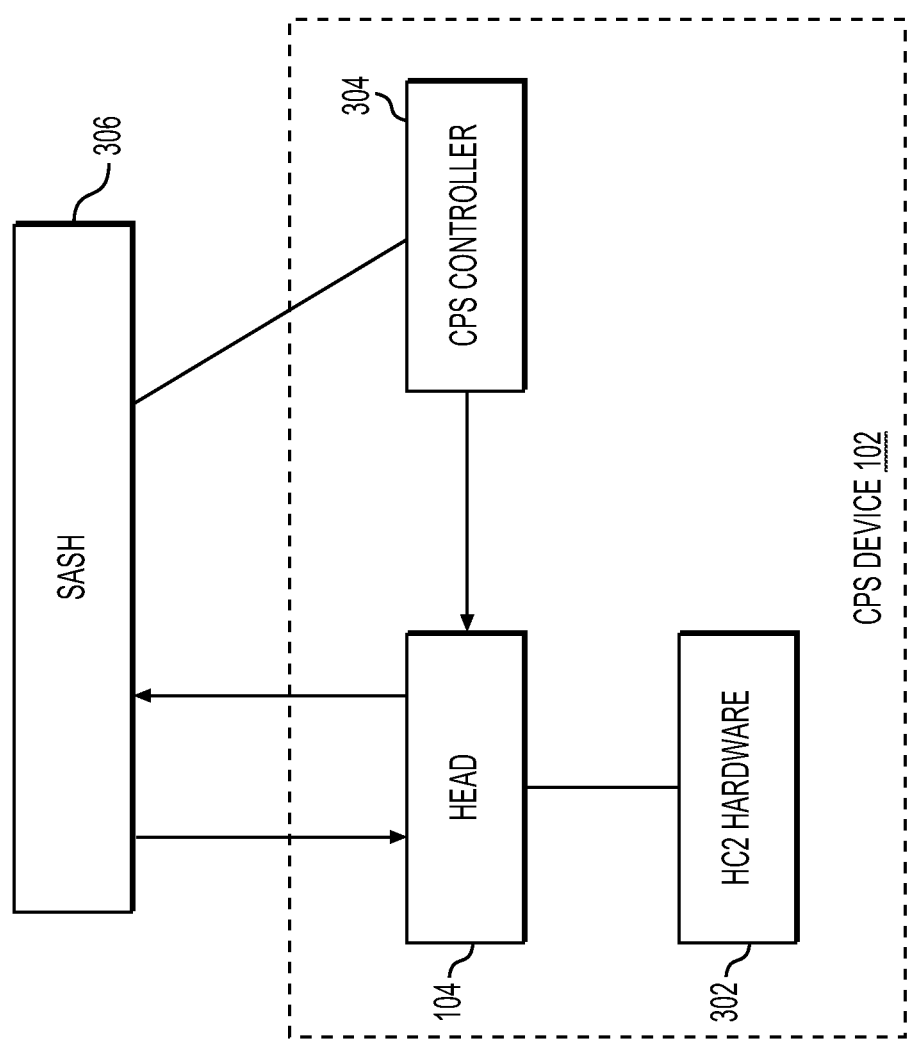
FIG. 3 depicts a system architecture of the HEAD according to some embodiments.

FIG. 3 depicts a system architecture of the HEAD 104 according to some embodiments. As shown in FIG. 3, the HEAD 104 may be deployed on interconnected cybersecurity system hardware (hereinafter referred to as "HC2 hardware 302"). In some embodiments, the HC2 hardware 302 may be an addition to the CPS device 102. The HEAD 104 may monitor the CPS device 102, e.g., the CPS controller 304, send monitoring status to a secure access server, SASH 306, and receive learning updates from the SASH 306.

Figure 4:
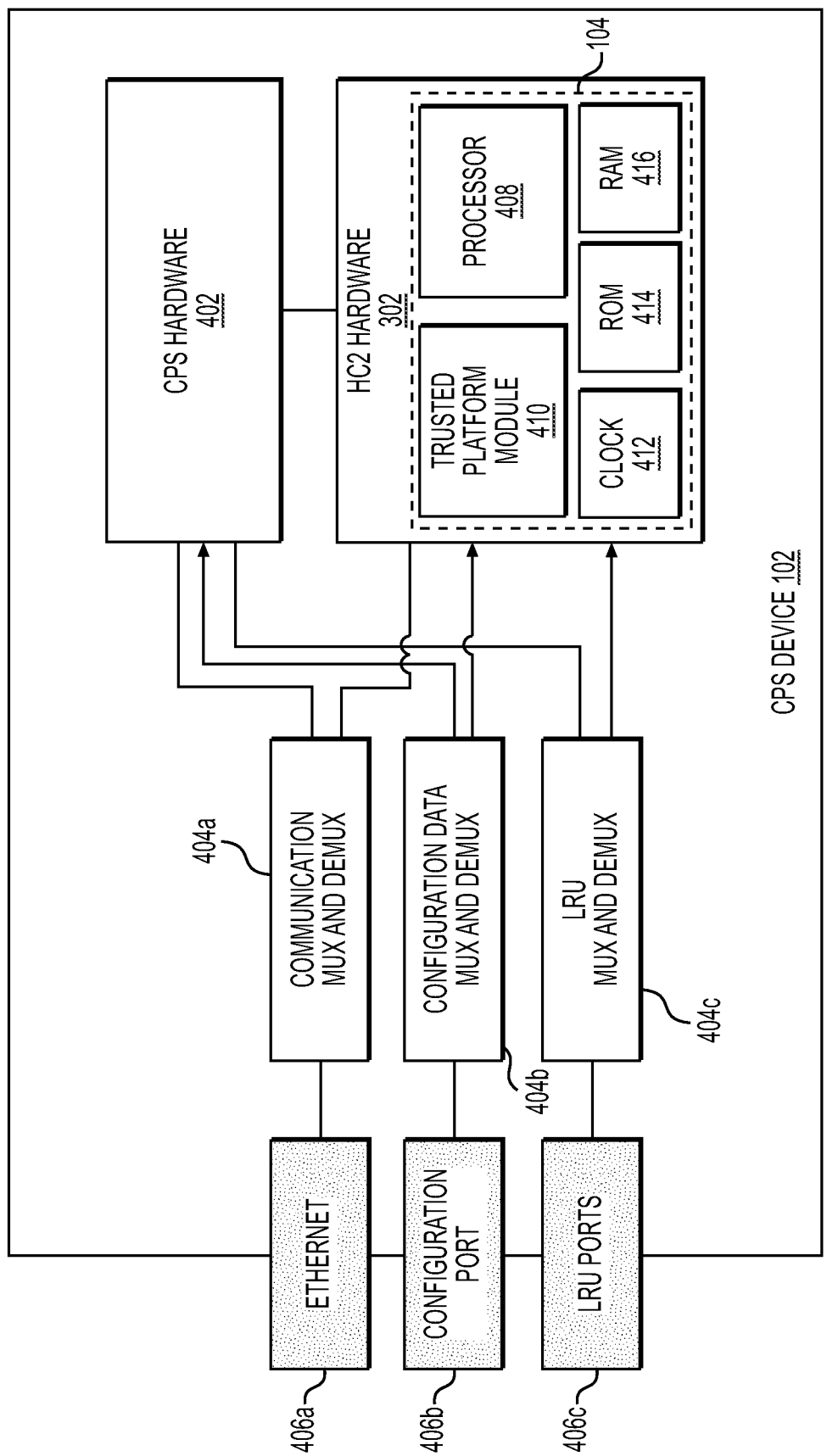
FIG. 4 depicts one or more hardware components associated with the HEAD according to some embodiments.

FIG. 4 depicts one or more hardware components associated with the HEAD 104 according to some embodiments. As shown in FIG. 4, the hardware for the HEAD is housed in the CPS device 102, along with CPS hardware 402, e.g., CPS controller 304, that performs the main functionality of the CPS device 102. The HEAD 104 may run on an embedded platform, HC2 hardware 302, configured to execute HC2 functions local to the CPS device 102. The input/output ports 406a-406c of the CPS device 102 may be are connected through mux/demux devices 404a-404c to the CPS hardware 402 and HEAD 104. The connection to the input/output ports 406a-406c enables the HEAD 104 to monitor the inputs and outputs in parallel to the CPS hardware 402 performing the main functionality of the CPS device 102 via those inputs and outputs 406a-406c.

As shown in FIG. 4, the HEAD 104 is executed on an embedded computing platform, e.g., the HC2 hardware 302. The HC2 hardware 302 may include a processor 408, a trusted platform module (TPM) 410, a clock 412, ROM 414, and RAM 416 according to some embodiments. The processor 408 may be an embedded processor and/or a digital signal processor. In some embodiments, the processor 408 may have floating point capability. The TPM 410 may be a secure crypto-processor configured to generate, store, and/or limit the use of cryptographic keys to booting modules, attestation, and HC2 port tamper detector (PTD). ROM 414 may include sufficient memory to host the HEAD 104 and related parameters. RAM 416 may include sufficient memory to log security events for the HEAD 104. Clock 412 may provide accurate time for security event time-stamps. In some embodiments, the clock accuracy may be approved by the National Security Agency (NSA).

Communication data mux/demux 404a may be configured to route communication messages. The communication data mux/demux 404a may route incoming messages that are normally destined for the CPS hardware 402 to the following two locations: the CPS hardware 402 so the CPS hardware 402 can perform its main functionality, and the HC2 hardware 302 so the HEAD 104 can monitor incoming messages. The communication data mux/demux 404a may route outgoing messages from the CPS hardware 402 to the following two locations: the network (e.g., via Ethernet) so the CPS hardware 402 can perform its main functionality, and the HC2 hardware 104 so the HEAD 104 can monitor outgoing messages. The communication data mux/demux 404a may route incoming messages that are intended for the HEAD 104 to: the H2C hardware 302, and optionally to the CPS hardware 402. In some embodiments, the CPS hardware 402 may ignore messages intended for the HEAD 104. The communication data mux/demux 404a may route outgoing messages from the HEAD 104 on the HC2 hardware 302 to the network.

Configuration data mux/demux 404b may route incoming and outgoing messages of the configuration port 406b. In some embodiments, a physical interface for the CPS device 102 may be a copper RS-485 two-wire interface. In some embodiments, the data flow encapsulated on the link may comprise standard ASCII data characters represented as a NRZ encoded data stream. It is understood that any serial communications interface capable of generating this data stream may be utilized by the CPS device 102.

The configuration data mux/demux 404b may route incoming messages that are normally destined for the CPS hardware to the following two locations: the CPS hardware 402 so the CPS hardware 402 can perform its main functionality; and the HC2 hardware 302 so the HEAD 104 can monitor incoming messages. The configuration data mux/demux 404b may route outgoing messages from the CPS hardware 402 to the following two locations: configuration port 406b so the CPS hardware 402 can perform its main functionality; and the HC2 hardware 302 so the HEAD 104 can monitor outgoing messages. The configuration data mux/demux 404b may route incoming messages that are intended for the HEAD 104 to: the H2C hardware 302; and optionally to the CPS hardware 402. In some embodiments, the CPS hardware 402 may ignore messages intended for the HEAD 104. The configuration data mux/demux 404b may route outgoing messages from the HEAD 104 on the HC2 hardware 302 to just the configuration port 406b.

Line replaceable unit (LRU) data mux/demux 406c may route inputs and outputs of one or more LRUs that are part of the CPS device 102. In some embodiments, the inputs and outputs may include: logic level signals, analog signals, serial communications, etc. The LRU inputs and outputs may be used for various purposes, including: sensor measurements (e.g. a millivolt analog electrical signal from a thermocouple), actuation commands (e.g. a 1 amp analog electrical drive current to a motor), settings to a device (e.g. set the scale for a digitizer), user interactions (push buttons, status lights, display, keystrokes, etc.), etc.

The LRU data mux/demux 406c may route incoming data that are destined for the CPS hardware 402 to the following two locations: the CPS hardware 402 so the CPS hardware 402 can perform its main functionality; and the HC2 hardware 302 so the HEAD 104 can monitor incoming messages. The LRU data mux/demux 406c may route outgoing data from the CPS hardware 402 to the following two locations: the configuration port 406b so the CPS hardware 402 can perform its main functionality; and the HC2 hardware 302 so the HEAD 104 can monitor outgoing messages.

Figure 5:
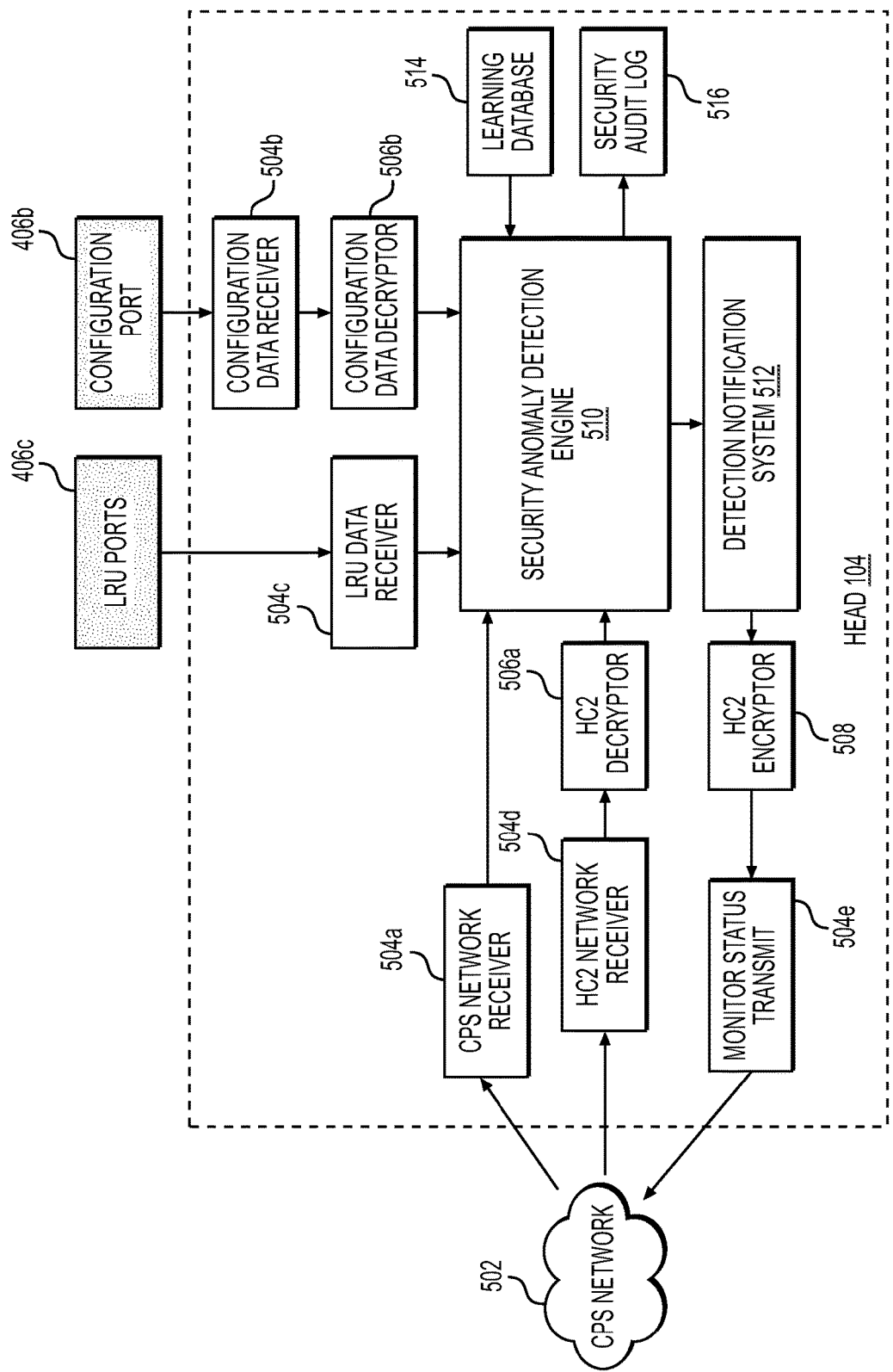
FIG. 5 depicts one or more software components associated with the HEAD according to some embodiments.

FIG. 5 depicts a logical view of the HEAD 104 according to some embodiments. As shown in FIG. 5, the HEAD 104 may include a security anomaly detection engine 510 (hereinafter referred to as detection engine 510) that may execute algorithms on CPS data to detect attacks, a detection notification system 512, and a security audit log 516 for producing notifications and records of detected attacks; receivers 504a-504d and transmitter 504e for interfacing with data on the CPS network 502, LRU ports 406c, and configuration port 406b; and encryptor 508 and decryptors 506a-506b for handling encrypted communications.

Detection engine 510 may detect anomalies in the CPS device 102 and its data input and outputs. Dynamic signals may include sensor signals, command signals, user interface signals, mode-related signals, internal signals, network port data, LRU port data and configuration interface port data. The detection methods are described in further detail below. When an anomaly is detected by the detection engine 510, the detection engine 510 sends a notification to the detection notification system 512.

The detection notification system 512 may communicate detection events and support data to platform security services. In some embodiments, the communication takes place over the CPS Network 502.

The security audit log 516 may include a record of events to support security audit logging (e.g. HEAD start/stop, 'alive', anomaly detected, detection time, etc.)

A learning database 514 may store a history of detected anomalous events with sufficient detail to support continuous improvement of detection capabilities of the HEAD 104. The stored information may be used for algorithm training and tuning purposes so that an artificial intelligence system of the HEAD 104 may continue to evolve as new anomalies are detected.

CPS network receiver 504a may be an interface to the CPS Network 502 that the HEAD 104 uses to collect data from network messages that are sent to and from the CPS controller 304 as part of the main functionality of the CPS device 102. The CPS network receiver 504a may provide a copy of these messages to the detection engine 510, where the detection engine 510 processes the messages for anomalies.

HC2 network receiver 504d may be an interface to the CPS network 502 for messages that are intended for the HEAD 104. The CPS network receiver 504a may provide a copy of these messages to the detection engine 510, where the detection engine 510 processes the messages for anomalies.

LRU data receiver 504c may be an interface to the LRU device ports 406c for data that are input and output by the CPS controller 304 as part of the main functionality of the CPS device 102. The LRU data receiver 504c may provide a copy of these data to the detection engine 510, where the detection engine 510 processes the messages for anomalies.

Configuration data receiver 504b may be an interface to the configuration data port 406b. The configuration port 406b may be used by an external system to: install software updates on the CPS device 102 and/or interact with the CPS device 102, including commanding the CPS device 102 and querying the CPS device 102. The configuration data receiver 504b may provide a copy of these messages to the detection engine 510, where the detection engine 510 processes the messages for anomalies. Configuration data decryptor 506b may decrypt messages that arrive from the configuration data port 406b. HC2 decryptor 506a may decrypt messages that arrive from the CPS network 502 and are intended for the HC2 hardware 302. HC2 encryptor 508 may encrypt messages that the HEAD 104 sends out over the CPS network 502.

In some embodiments, HEAD 104 may monitor any combination of the following non-limiting types of data: (1) network messages on the control network such as incoming and outgoing messages that are part of the main functionality of the CPS device 102 and incoming and outgoing messages that are related to the functionality of the HC2 hardware 302; (2) LRU data from LRU components that are part of the CPS device 102, but may be attached/detached via a connector and are thus a potential attack surface, where the LRU data may include logic level signals, analog signals, serial communications, and/or signals to and from a user interface; (3) communications through the CPS configuration port 406b including handshaking with an external device, software updates for the main functionality of the CPS device 102, edits to the parameter settings for the main functionality of the CPS device 102, and/or software updates for the HC2 hardware 302; and (4) CPS software variables in the main functionality of the CPS device 102 that may be exposed to the HEAD 104.

With reference to the network message, the HEAD 104 may monitor the input and output network message traffic and data passed over the control network. The HEAD 104 may monitor for violations of network protocol, violations of application protocol, and out-of-bounds deviations from "normal" operational constraints in the messaging and data. The details of this data may specific to each type of CPS device.

For example, for a valve actuator, an interface control document (ICD) may serve as a guide for the data that could be monitored. According to the ICD, a communication master engine (e.g., Profibus master) may initiate all data transfers at a periodic frequency. The valve actuator sends a response message immediately following each message from the communication master engine. The valve actuator may only respond to messages that contain its unique slave destination address. In some embodiments, the valve actuator may support periodic communication frequencies up to a few 10s of Hertz.

During each communication data exchange cycle, the communication master engine may send a message containing data to the valve actuator slave device. This message data may be referred to as a "Command" data assembly. The valve actuator may immediately send a response message, referred to as a "Status" data assembly. An example of the specific data elements defined in these assemblies are identified in the following tables and may also be detailed in the ICD.

TABLE 1

Command Data Assembly

Data Element Name
Heartbeat
Actuator Position Command
Parameter ID Request
spare
CRC-16

TABLE 2

Status Data Assembly

Data Element Name
Heartbeat Echo
Actuator Position Acknowledge
Actuator Position Status
Parameter ID Request
Parameter Value
General Status Register
Fault Register
Opening Time
Shutting Time
Opening Current
Shutting Current
Spare
Command Error
CRC-16

The following tables list one or more example monitoring algorithms developed for automotive applications that would be applicable to the command and status messages described above. The monitoring algorithms are described in further detail below

TABLE 3

Applicable algorithms for command messages to the valve actuator

| Command Message Attribute | Algorithm | Description |
|---|---|---|
| Message timestamps | rate, or onPeriod | Alert if commands arrive outside of fixed period within jitter |
| "Actuator Position Command" signal | range | Alert if command is not one of the valid values |
| | Discrete signal chatter | Alert if command signal goes changes excessively in time (multiple changes) |
| | Discrete signal chatter tuned for minimum dwell | Alert if command does not wait long enough between open-close or close-open (single change, no smoothing) |
| | State Transition | Alert if command violates state transition rules for Open, Shut, No Command |
| "Heartbeat" signal | Message Counter | Alert if heartbeat increment does not equal 1 |
| "Parameter ID Request" signal | Range | Alert if ID is not one of the valid values |
| "spare" signal | Learned Const or Const | Alert if spare signal changes in time, or does not equal a known fixed value |
| "CRC-16" signal | CRC | Alert if CRC signal is not valid |

TABLE 4

Applicable algorithms for response status messages from the valve actuator

| Status Message Attribute | Algorithm | Description |
| --- | --- | --- |
| timestamp | Message Time | Check that Status message follows Command 1-to-1 and within time limits |
| Heartbeat Echo | Signal Forward | Check that Status Heartbeat equals Command Heartbeat |
| Actuator Position Acknowledge | Range | Alert if the value is not one of the valid values |
| | Signal Forward | Check that Status Position equals Command Position |
| Actuator Position Status | Range | Alert if the value is not one of the valid values |
| Parameter ID Request | Range | Alert if the value is not one of the valid values |
| Parameter Value | Alg | Alert if the value is not one of the valid values for the requested ID |
| General Status Register | Range | Alert if the value is not one of the valid values |
| Fault Register | Learned Const or Const | This is a bit map signal, some of which are unused. Break out the signal into multiple bits. Alert if the unused bits change in time, or does not equal a known fixed value |
| Opening Time | Range | Alert if the value is outside of healthy limits. Limits may be reduced from the total valid range. |
| Shutting Time | Range | Alert if the value is outside of healthy limits. Limits may be reduced from the total valid range. |
| Opening Current | Range | Alert if the value is outside of healthy limits. Limits may be reduced from the total valid range. |
| Shutting Current | Range | Alert if the value is outside of healthy limits. Limits may be reduced from the total valid range. |
| spare | Learned Const or Const | Alert if value changes in time, or does not equal a known fixed value |
| Command Error | Range | Alert if the value is not one of the valid values |
| CRC-16 | CRC | Alert if CRC signal is not valid |

For the valve actuator, the LRU data may be described in a related software design document.

For the valve actuator, the configuration port communications may be described in a related interface document. In some embodiments, the physical interface may be a copper RS-485 two-wire interface. The data flow encapsulated on the link may comprise of standard ASCII data characters represented as a NRZ encoded data stream. It is understood that any serial communications interface capable of generating this data stream may be utilized. The formats for function calls and responses may be provided in the related interface document.

For the valve actuator, potential data signals may be found in a related software design document.

Figure 6:
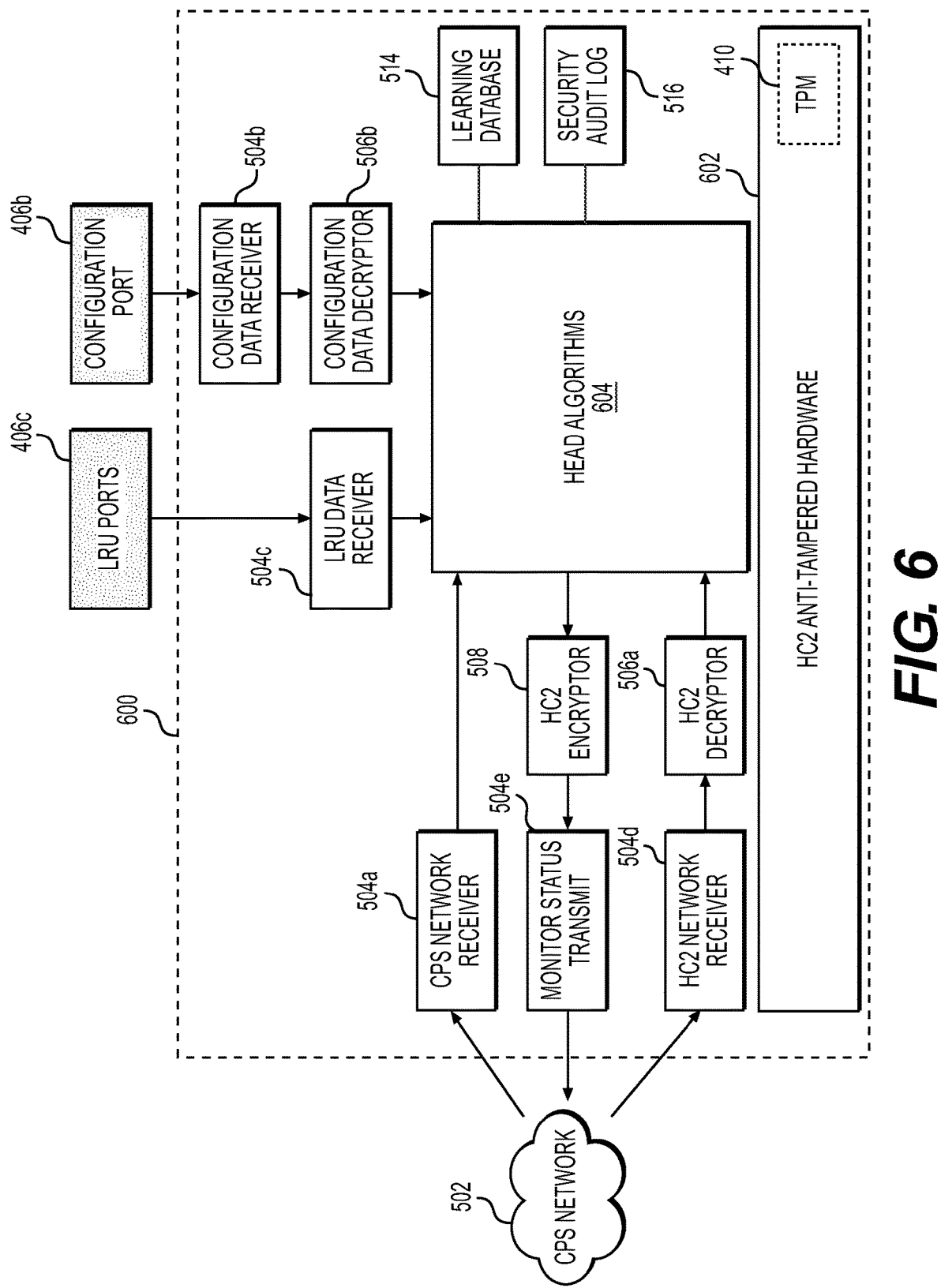
FIG. 6 depicts a security view of the HEAD according to some embodiments.

FIG. 6 depicts a security view of the HEAD 104 according to some embodiments. In some embodiments, the HEAD 104 and HC2 hardware 302 may be secure and assured, according to NIST SP 8000/53 and NIST RMF medium robustness. For example, the security assurance may apply to all components inside the security perimeter 600 depicted in FIG. 6 and a description of the security objective for the HEAD 104 is provided in further detail below.

The key components that need to be protected may be the HEAD detection algorithms 604 and the learning database 514. These elements are protected by assuring that the hardware, e.g., HC2 hardware 302 is resistant to tampering, via the HC2 anti-tampered hardware 602.

HEAD 104 may meet the trusted path security requirement by rooting its trust in the hardware, e.g., the Trusted Platform Module 410 (TPM). HEAD 104 may be encrypted and stored, and the encryption key may be stored in the TPM 410 and may be used to decrypt the HEAD 104 prior to execution, thereby protecting HEAD 104 from rootkit attack.

HEAD 104 monitor status may be sent to a user of the CPS device 102 via one or more secure communication channels. Network communication (outside of the CPS device data) with the HEAD 104 may utilize one or more secure communication channels through the SASH 306.

Configuration data through the configuration port 406b may be communicated using a secure channel between the CPS device and a maintenance device, e.g., smart maintenance device (SMD). Traffic from any other sources may be blocked as will be described in further detail below. In some instances, the traffic from any other sources may be blocked by a HC2 PTD. HEAD 104 may log relevant security events with the security audit log 516.

An example of processing network message for anomalies is provided below. In some embodiments, this workflow may trigger when a new message is received by the CPS device 102 over the network, or a new message is to be sent by the CPS device 102. The purpose of the workflow may be to examine the message for anomalies that are indicative of an attack. Depending on the CPS device and its network API, there may be a variety of network message types that the HEAD 104 may cover.

In some embodiments, the HEAD 104 may use one or more anomaly detection algorithms 604 configured to operate on messages. The data used by each algorithm may be algorithm-specific and CPS device-specific. In general, the detection algorithms 604 may use the following information: header data of the message, as applicable; type of the message, as applicable; source of the message; adherence to applicable protocols and the API; data contents of the message; timing of the message relative to other messages (e.g. commands arriving faster than usual); state of the CPS device (e.g. the CPS device received a command that is illegal in its current state); and/or CPS configuration parameters.

The workflow for processing network message for anomalies may start when the CPS device 102 receives or sends a message over the network. The HEAD 104 may consume the network message. HEAD 104 may identify and anomaly detection algorithms 604 that are appropriate for the message. HEAD 104 may log any detected anomalies. HEAD 104 may retain a copy of the message in recent-message-history RAM. If any anomalies where detected, HEAD 104 may send a network message via the SASH 306 to platform-level security services. The workflow for processing network message for anomalies may end the identified algorithms have run, and the results have been reported.

Some consideration regarding how HEAD 104 receives network messages is now explained. The main functionality of the CPS device 102 may have a means to receive, unpack, process, and act on incoming network messages. The main functionality of the CPS device 102 may be the intended recipient of the incoming network messages. In implementations where the HEAD may be integrated into the same executable with the main functionality of the CPS device 102, this workflow for processing network message for anomalies may be launched as an add-on to the existing CPS functionality that processes messages. The main CPS device 102 would call a HEAD method and pass the message information as part of the call. In implementations where the HEAD 104 resides on a standalone circuitry, HEAD 104 may include HEAD 104 circuitry configured to independently listen to incoming messages and launch this workflow for processing network message for anomalies and/or establish a communication link with the main CPS device 102 computer, where the CPS device 102 computer may actively send relevant information of each incoming message to the HEAD 104.

Some consideration regarding how HEAD 104 interacts with CPS device activities is now explained. When an incoming message arrives, the CPS main functionality and HEAD 104 may both act on the message. In some embodiments, the CPS device 102 (e.g., the CPS hardware 402) may act first followed sequentially by the HEAD 104. In some embodiments, the HEAD 104 may acts first, followed sequentially by the CPS device 102. In some embodiments, the CPS device 102 and HEAD 104 may act on the message in parallel. Having the CPS device 102 act first may ensure that HEAD 104 does not disrupt some time-sensitive action of the CPS when the HEAD 104 and CPS hardware 402 are integrated in the same executable. Having HEAD 104 act first may be necessary if HEAD 104 is configured to block attacks. This workflow may use multiple algorithms, some of which may make use of CPS device state information prior to the incoming message. CPS device 102 actions before or in parallel with the HEAD 104 may have the potential to alter those state variables. HEAD 104 may need to access the state variables prior to the CPS device 102 actions.

In some embodiments, the HEAD 104 may use one or more anomaly detection algorithms 604 for processing analog I/O from a component. In this workflow of processing analog I/O, the HEAD 104 may inputs analog I/O from the component, e.g., a sensor. For example, the analog I/O may be the millivolt reading from a thermocouple. In some embodiments, the analog signal may be digitized by an analog-to-digital converter (ADC). The digitized signal value may be consumed by the HEAD 104 and by the main functionality of the CPS (e.g., CPS hardware 402) and used for computations. Depending on the application, multiple analog signals may be measured substantially simultaneously and made available at the same time to the HEAD 104 according to some embodiments. In such embodiments, this workflow of processing analog I/O may process all input signals as a single workflow rather than initiating separate workflows for each signal. Depending on the application, some ADC devices may use a serial output interface and may be capable of sending a message containing all the digitized analog signal values, as well as diagnostic information about the health of the ADC. In such instances, this workflow of processing analog I/O may essentially be the same as the workflow for processing incoming serial I/O.

This workflow of processing analog I/O may starts upon one of the following conditions, depending on how the HEAD 104, CPS main functionality (e.g., CPS hardware 402), and ADC work together. For example, the workflow of processing analog I/O may start when the ADC transmits new analog data. As another example, the workflow of processing analog I/O may start periodically under control by the HEAD 104 when the HEAD 104 initiates analog-to-digital conversion by the ADC. Upon initiation of the workflow of processing analog I/O, the HEAD 104 may consume the digitized signal value(s). The HEAD 104 may identify and run anomaly detection algorithms 604 that may be appropriate for the analog signals. The workflow of processing analog I/O may end when all algorithms assigned to the incoming signals have run, and the results have been reported.

There may be several ways the HEAD 104 may gain access to the analog I/O signal depending on the physical and logical configuration of the HEAD 104 with respect to the rest of the CPS device 102 in terms of electronics and software. In some embodiments, the HEAD 104 may have its own independent ADC that digitizes the analog signal for the HEAD 104. In some embodiments, the HEAD 104 and CPS hardware 402 may both have an electrical connection to the output of a common ADC component, and both listen to the same digitized output in parallel. In some embodiments, the HEAD 104 may have a primary interface to the ADC in the CPS device 102 and publish the digitized signal values to the main functionality of the CPS (e.g., CPS hardware 402) through a software-to-software interface or through an electrical bus interface. In some embodiments, the CPS main functionality (e.g., CPS hardware 402) may have the primary interface to the ADC in the CPS device 102 and publish the digitized analog signal value to the HEAD 104 through a software-to-software interface or through an electrical bus interface.

A workflow for processing serial I/O from a component may be similar to the workflow of processing analog I/O with the exception of the HEAD 104 using a serial interface instead of an ADC.

A workflow for checking CPS variables may be run periodically. The workflow for checking CPS variables may inspect a select set of internal variables of the CPS main functionality (e.g., CPS hardware 402) for anomalous behavior.

Algorithms utilized by and associated with the HEAD 104 are now explained. That is, the HEAD detection algorithms 604 are described in further detail below.

For example, a range algorithm may check that a signal is within its allowed value domain. Instances of the Range algorithm may assigned to individual signals in the messages to and from the CPS device 102 over the network, signals to and from the LRUs, and signals in the CPS RAM. But this may be only if the signal has constraints on its legal values. Notional examples may include: a 3-bit enumeration signal in a message, where values 4, 5, and 6 are unused or reserved; and a fixed point analog temperature signal where −50 through +250 are legal values, and the discrete values 511 indicates a fault, and 510 indicates sensor not available.

The range algorithm may have parameters (e.g., rangeList and discreteList) that specify the allowed value domain for the signal in the form of one or more continuous ranges and a set of discrete values. An example of a pseudo code for the range algorithm is provided below.

```
% Check continuous ranges
for thisRange in rangeList
    if thisRange[0] <= currentValue <= thisRange[1]
        return VALID
% Check discrete domain
if currentValue in discreteList
    return VALID
% Signal value was not in the allowed domain
return INVALID
```

As another example, a message counter algorithm may be assigned to "message counter" signals in network messages.

Such signals may be utilized in control networks to enable data integrity checks, such as detecting that a message was dropped. The transmitting node may include a message counter signal as part of its message, and increment the counter signal by 1 with each message sent by the sender. When the message counter reaches the top of its counting range (e.g. 255) the next increment may wrap around to the bottom of the counting range (e.g. 1).

Some systems may also use a reserved value outside the normal counting range to convey to the receiver that the sender had a reset. If the sender needs to reset the count (e.g. the sender rebooted) it may start at the reserved value (e.g. 0), and the receiver may recognize that a reset occurred. The count may then proceed from the reset value into the normal counting range. Without this reserved reset value, it may be ambiguous to the receiver to distinguish between sender resets and count discontinuity caused by communication errors.

In some embodiments, the message counter algorithm may have the following parameters: (i) wrapFromValue indicating the high value of the message counter signal before wrapping around and this is also the largest valid value for the signal, (ii) wrapToValue indicating the low value that the counter wraps down to after wrapFromValue and wrapToValue<wrapFromValue, (iii) resetValue indicating the reserved value used by the sender only when it resets, where resetValue=DISABLED indicates that this feature is disabled for this algorithm instance and resetValue<wrapToValue if resetValue is enabled, (iv) staleTime indicating the time gap between messages that the HEAD 104 can use to recognize that the sender may have restarted, where staleTime=DISABLED indicates that this feature is disabled for this algorithm instance, (v) staleValue indicating the value used by the sender when it starts, where staleValue=ANY indicates that the sender could start at any value within the counter range, staleValue only has meaning when staleTime is enabled, and wrapToValue<=staleValue<=wrapFromValue when it is enabled. An example of a pseudo code for the message counter algorithm is provided below.

```
// Check that the current value is in range
if currentValue>wrapFromValue
    return INVALID
if currentValue<wrapToValue
    if resetValue==DISABLED
        return INVALID
    if currentValue<resetValue
        return INVALID
// Gracefully begin after HEAD startup/reboot
if prevTime==NONE
    Return NOTRUN
// Check for normal counting
If currentValue==prevValue+1 || (currentValue==wrapToValue && prevValue==wrapFromValue)
    Return VALID
// Check for sender reset
If resetValue!=DISABLED && currentValue==resetValue
    // Invalid to be at resetValue for 2 messages in a row
    If prevValue == resetValue
        Return INVALID
    Else
        Return VALID
// Check for startup of the sender
If staleTime!=DISABLED && currentTime-prevTime>staleTime
    If staleValue==ANY
        Return NOTRUN
    Elseif currentValue==staleValue
        Return VALID
Return INVALID
```

As another example, a constant algorithm may applicable to individual signals that have an unchanging value that is known a priori and can be included in the HEAD 104 parameters when they are installed on the CPS device 102. A deviation from the known value may result in an alert. Examples may include: (i) reserved bytes in a message, (ii) node identifier values in a message, and/or (iii) CPS device 102 parameters that can only be set at the factory (e.g. controller gains, model and serial number).

The Constant algorithm may have an optional feature to allow the signal to deviate from the constant value under conditions where the sender of a message may have just reset. An example of a pseudo code for the constant algorithm is provided below.

```
if (currentValue == constValue)
    return VALID
if staleTime!=DISABLED && (prevTime==NONE ||
currentTime-prevTime > staleTime)
    if staleValue==ANY
        return NOTRUN
    if currentValue==staleValue
        return VALID
return INVALID
```

As yet another example, a learned constant algorithm may be similar to the constant algorithm, except the constant value may not be programmed into the HEAD 104 parameters. Instead the HEAD 104 may obtain the constant value from the actual signal value soon after HEAD 104 boot up. Thereafter the HEAD 104 may checks that signal value does not change.

The learned constant algorithm may have an optional feature to exclude certain values from being the learned constant. For example, certain values of the signal might convey "signal not available", and the signal might take on this value intermittently. The parameter excludeVals may contain the set of values (possibly empty) to exclude. An example of a pseudo code for the learned constant algorithm is provided below.

```
if (currentValue == learnedValue)
    return VALID
// Learn the value of the constant using the first instance of the signal
if (prevTime == NONE)
    learnedValue = currentValue
    return NOTRUN
// There is a chance the initial value was in the set excludeVals. That is not
a proper learned constant.
// Keep updating learnedValue until it is no longer in the set excudeVals.
if (learnedValue IN excludeVals)
    learnedValue = currentValue
    return NOTRUN
// Allow values in the excludeVals set to occur at any time
if (currentValue IN excludeVals)
    return NOTRUN
return INVALID
```

As another example, a discrete signal chatter algorithm may monitor a command signal that has a value domain consisting of an enumeration of discrete values (e.g. OPEN/CLOSE, or Park/Neutral/Reverse/$1^{st}/2^{nd}/3^{rd}$). The discrete signal chatter algorithm may alert when there is excessive activity over shorter times. Some considerations for the anomaly detector include message send-type and the semantics of the enumeration, as will be described in further detail below.

A message send-type may define conditions under which messages may be sent by the master. A general algorithm may support a variety of message send-types. For example, cases may include: purely periodic messages, on-change event-based messages; and/or messages that are combined periodic plus on-change event-based. In some embodiments, on-change event based message may be sent under certain conditions as follows: the message may be sent only when the signal of interest changes and/or the message may be sent when the signal of interest changes, and when at least one other signal in the message changes. In some embodiments, the algorithm may not need to consider on-change event-based messages where changes to the command do not result in message sends. The distinction between send-types may be that the algorithm may be made simpler if it only needed to cover messages with fixed time separations between messages.

With reference to semantics, a general algorithm may support a variety of signal semantics and how they translate into activity measured by the algorithm. Some cases may include: set-point commands, where changes to the set point may be considered activity by the algorithm, and lack of change may be considered inactivity, and action commands, where some signal values may be considered active (because they tell the CPS device to "do something active"), and other command values may be considered inactive (because they are synonymous with "do nothing" or "no command").

Either case of semantics may be addressed using an activity matrix that encodes the activity that the algorithm associates with between the previous command value and the current command value. A command where changes constitute activity may be addressed with a matrix having only off-diagonal elements like the example below.

TABLE 5

Example activity matrix for set-point command semantics

| | | cmd(t) | | | | | |
|---|---|---|---|---|---|---|---|
| | | P | R | N | $1^{st}$ | $2^{nd}$ | $3^{rd}$ |
| cmd(t − 1) | P | 0 | 1 | 1 | 1 | 2 | 2 |
| | R | 1 | 0 | 1 | 1 | 3 | 3 |
| | N | 1 | 1 | 0 | 1 | 1 | 1 |
| | $1^{st}$ | 1 | 1 | 1 | 0 | 1 | 1 |
| | $2^{nd}$ | 1 | 1 | 1 | 1 | 0 | 1 |
| | $3^{rd}$ | 1 | 1 | 1 | 1 | 1 | 0 |

For the case of action commands, the matrix may have no-zero diagonal elements and any transition to the "No Command" value would be treated as activity.

TABLE 6

Example activity matrix for action commands

| | | cmd(t) | | |
|---|---|---|---|---|
| | | No Cmd | Open | Shut |
| cmd(t-1) | No Cmd | 0 | 1 | 1 |
| | Open | 0 | 1 | 1 |
| | Shut | 0 | 1 | 1 |

In some embodiments, the valve actuator may use purely periodic messages, and action commands with the following non limiting semantics:

(1) OPEN indicating that a CPS device 102 (e.g., an actuator) is to perform the sequence of actions to move from the closed position to the open position. The sequence of actions may include: unlocking the position, powering the motor to drive the valve to the open position, relocking the position, depowering the motor. This command value may be considered 'active" by the algorithm.

(2) CLOSE indicating that the CPS device 102 (e.g., an actuator) is to perform the sequence of events to move from the open position to the closed position. This command value may be considered 'active".

(3) NO_COMMAND indicating that the CPS device 102 (e.g., an actuator) is to remain locked in the previous commanded position. If the actuator has not yet completed its previous command, it may continue towards completing the previous command. This command value may considered 'inactive" by the algorithm.

The master may generally know the current state of the CPS device 102 (e.g., an actuator). The master may only send OPEN or CLOSE command values when the actuator state must change. Otherwise, most of the command values sent by the master may be NO_COMMAND. The master may not send consecutive OPEN commands or consecutive CLOSE commands.

Figure 7:
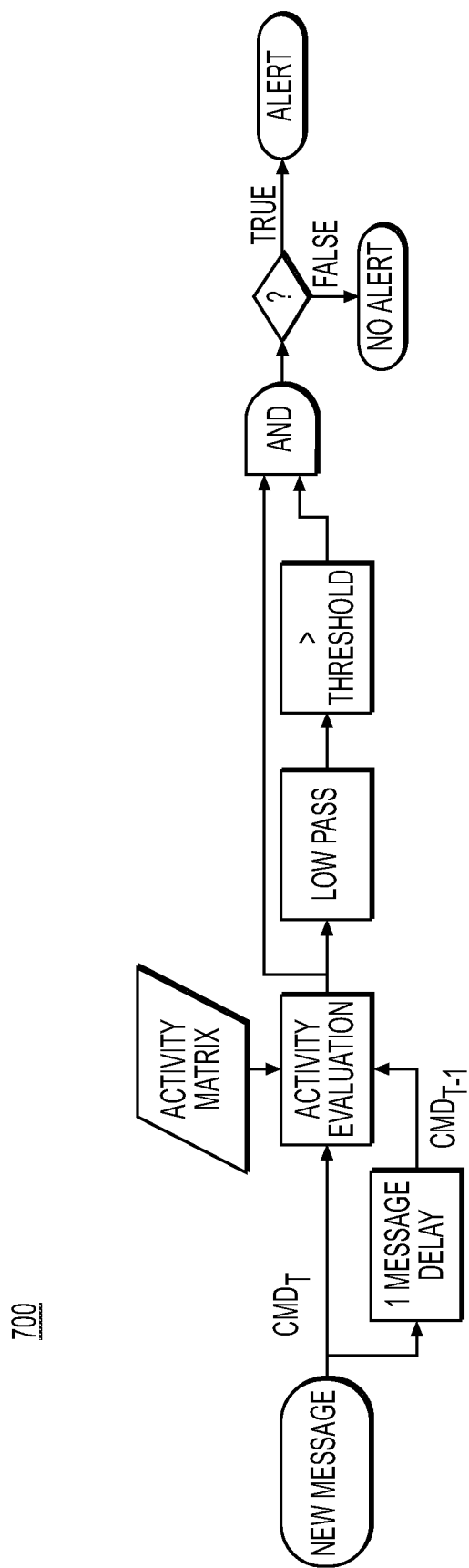
FIG. 7 depicts a block diagram for anomaly detection for purely periodic message according to some embodiments.

FIG. 7 depicts a block diagram 700 for anomaly detection for purely periodic message according to some embodiments. As shown in FIG. 7, each time a message arrives, the command signal may be compared to the previous signal in an activity evaluation block. The block may output zero if the message contains no activity, and 1 if there is activity. The block may also output larger numbers if a message constitutes extreme activity. Because the messages are periodic, a simple RC low pass (LP) filter may be used to evaluate excessive activity in time, as it integrates to larger values if active messages are close in time, and exponentially decays to zero during gaps between activity. The anomaly detector may output an alert if the current message is active and the LP filter is above a threshold.

Figure 8:
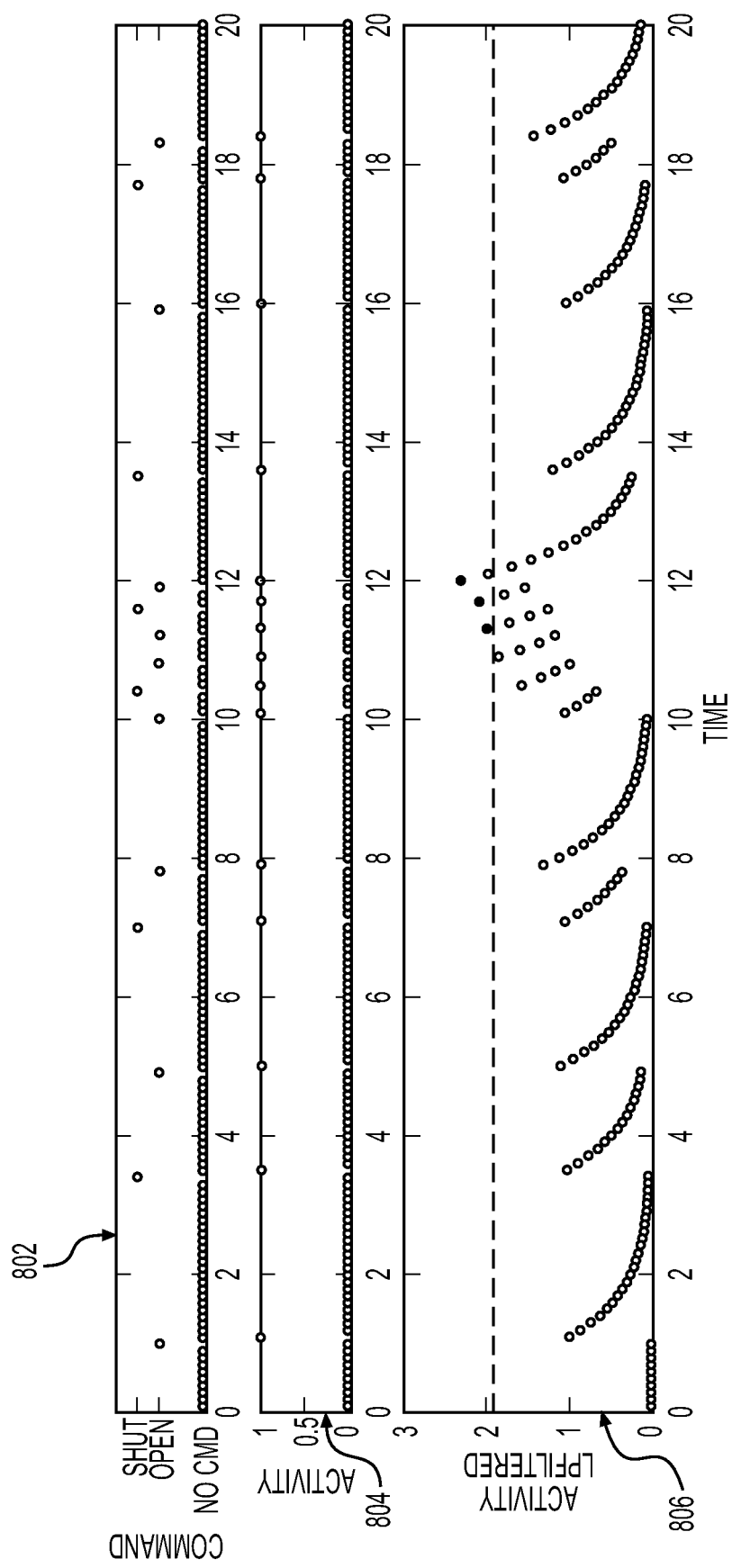
FIG. 8 depicts an example of algorithm behavior for fixed periodic messages and action command semantics according to some embodiments.

FIG. 8 depicts an example of algorithm behavior for the case of fixed periodic messages and the action command semantics and activity matrix described above in Table 6. The top subplot 802 shows the command signal monitored by the algorithm. Each dot corresponds to a message. The normal command behavior is to Open or Close the valve at irregular times with relatively large separations in time. The example command signal in FIG. 8 has a simulated attack, where there is excessive command activity in the time range 10<time<12. The algorithm assesses the activity in each message using the activity matrix, as shown in the middle subplot 804. The algorithm may use the integration and decay characteristics of a low pass filter to accentuate excessive activity over short times, as shown in the bottom subplot 806. When there are multiple messages within a short time, the low pass filter does not have time to decay to back to zero between active messages. The algorithm may alert on messages that have activity and where the output of the low pass filter is above threshold.

Figure 9:
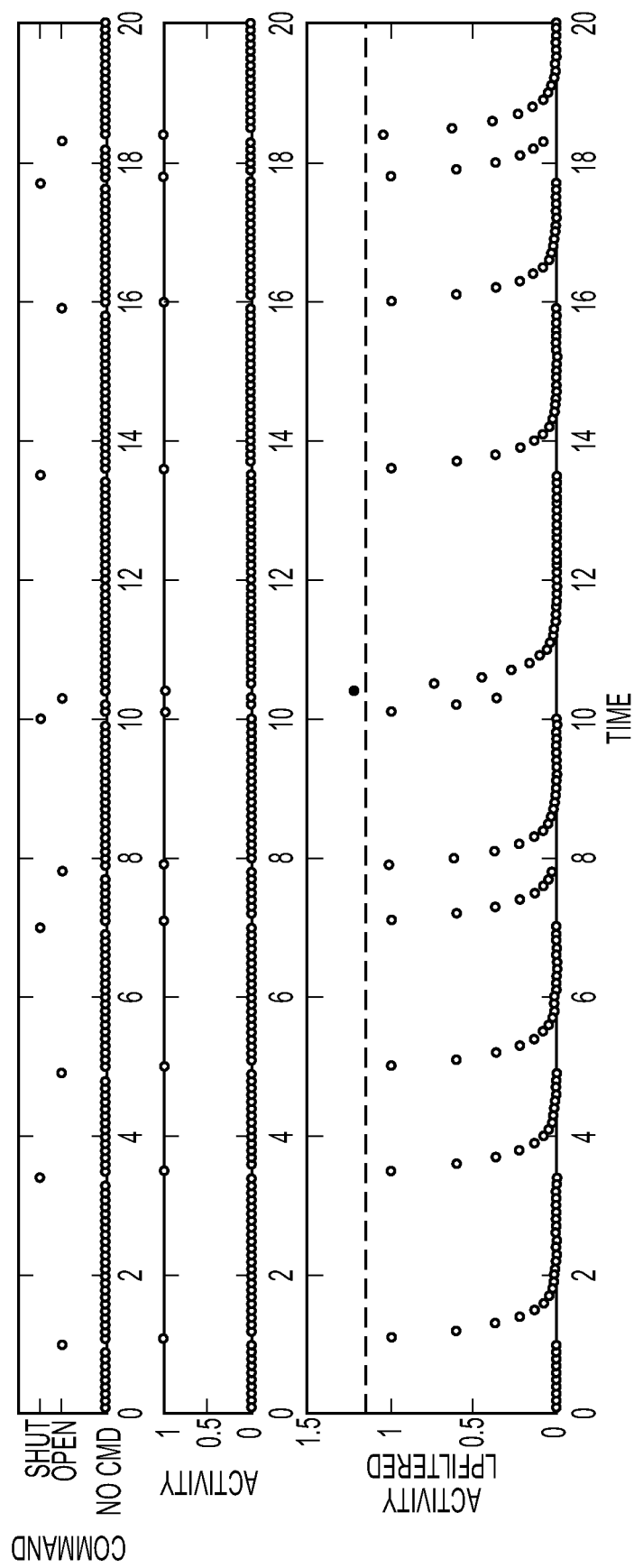
FIG. 9 depicts an example of an algorithm according to some embodiments.

FIG. 9 depicts an example of a different tuning of the algorithm designed to detect any two active messages occurring too close together in time according to some embodiments. This may be referred to as a "minimum dwell time" tuning for the algorithm. With this tuning, the threshold may be set just above the LP filtered activity from an isolated event, and the RC filter constant may be set so that anything below the minimum allowed dwell time produces an alert.

Figure 10:
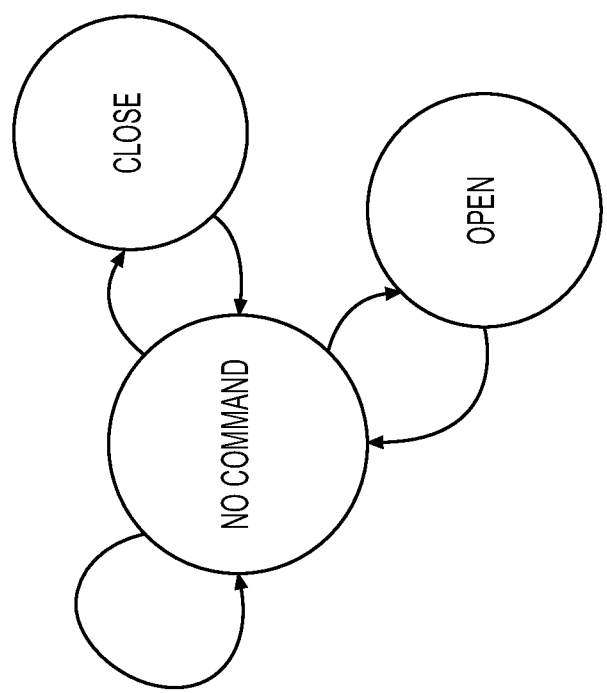
FIG. 10 depicts an exemplary state transition diagram according to some embodiments.

Returning now to the example of algorithms, a state transitions algorithm may compares the current and previous value of a discrete signal to verify that the signal transition has not violated any constraints. FIG. 10 depicts the allowed transitions of the valve actuator position command signal, sent by the master in periodic messages. Most messages may contain "No Command" and there may be rare commands to "Open" or "Close" the valve, but not consecutively. Table 7 below shows the corresponding "transition matrix" representation for the allowed state transitions. Each row and column of the matrix may correspond to an allowed value of the command signal, and a matrix cell contains a '1' if the transition is allowed.

TABLE 7

Example transition matrix for valve actuator commands

|  |  | Current value | | |
|---|---|---|---|---|
|  |  | 0 | 3 | 12 |
| Previous value | 0 = No Command | 1 | 1 | 1 |
|  | 3 = Open | 1 |  |  |
|  | 12 = Shut | 1 |  |  |

For signals with a small value domain (e.g. only 4 allowed values) the state transitions algorithm may be efficiently parameterized using a square transition matrix like Table 7. The transition matrix may become cumbersome if there are a large number of allowed values for the signal. To support signals in such cases, the state transitions algorithm may be parameterized using several parameters that can contain the same information as transmission matrix, but scale better to larger numbers of allowed values. The parameters may include the following: (i) allowedValues indicating a list of legal values for the signal, (ii) allowRepeat indicating a list of signal values that can be the same for current and previous, where, in the transmission matrix, these may correspond to signal values with 1 on the diagonal, (iii) allowTo indicating a list of current signal values that any other previous signal value can transition to, where, in the transition matrix, these may correspond to signal values that have a column of all 1's except possibly the diagonal, (iv) allowFrom indicating a list of previous signal values that may transition to any other allowed value, wherein, in the transition matrix, these may correspond to signal values that have a row of all 1's except possibly the diagonal, (v) allowedTransition indicating a list of pairs, <previousValue, currentValue>, representing any remaining transitions that were not already covered by the other parameters.

For the valve actuator, the parameterization as shown below and an example of a pseudo code for the state transitions algorithm is provided below.

```
allowedValues = [0, 3, 12] (corresponding to "No Command", "Open", "Shut"
allowRepeat = [0]
allowTo = [0]
allowFrom = [0]
allowedTransitions = [ ]
if !(currentValue in allowedValues)
    return INVALID // Illegal value
If !exist(previousValue)
    return NOTRUN // No previous value (e.g. this is the first message)
if !(previousValue in allowedValues)
    return NUTRUN // Previous value was illegal. Don't double-alert
if (currentValue == previousValue
    if currentValue in allowRepeat)
        return VALID // Value is allowed to repeat
else
    if (currentValue in allowTo)
        return VALID // Any other previous value is allowed before current value
    if (previousValue in allowFrom)
        return VALID // Any other current value is allowed after previous value
    if <previousValue, currentValue> in <validTransitions>
        return VALID // pair is in the transition table
return INVALID
```

As another example, a signal correlation algorithm may monitors a pair of analog signals X and Y that should be related according to the equation: Y=scale*X+offset. The signal correlation algorithm may alert if the signals fall outside of the upper and lower correlation limits: scale*X+lowerLim<=Y<=scale*X+upperLimit. Here lowerLimit and upperLimit have absorbed the offset value. The signal correlation algorithm may allow for normally occurring exceptions relative to the limits including: (i) stale values, as determined by timestamps, and (ii) signal-not-available, sensor FailStatus, etc.

The signal correlation algorithm may determine exceptions due to signal-not-available and sensor FailStatus, etc. by checking for particular values of the X and/or Y signals, and/or by checking designated "out-of-band" (OOB) indicator signals originating from built-in-test. The two signals may originate anywhere in the CPS device 102, such as incoming and outgoing messages, data received from CPS components (e.g., LRU), or internal CPS variables. When the signal correlation algorithm is associated with a signal in a network message, the signal correlation algorithm may run for every occurrence of that message. An example of a pseudo code for the signal correlation algorithm is provided below.

```
// check that the correlation limits are met
scaledVal = XSignalValue * scale
if (scaledVal + lowerLimit <= YSignalValue &&
        scaledVal + upperLimit >= YSignalValue)
    return success
// check the timing of the messages.
if (YMessageTimestamp – XMessageTimestamp > staleTo)
    return success
// check exclude values
    if (YSignalValue IN excludeY)
        return success
if (XSignalValue IN excludeX)
    return success
// check the OOB values
if (oobYSignalVal IN oobY.excludeVals)
    return success
if (oobXSigVal IN oobX.excludeVals)
    return success
// return error if the correlation is not met, and there is no excuse.
return error
```

Figure 11:
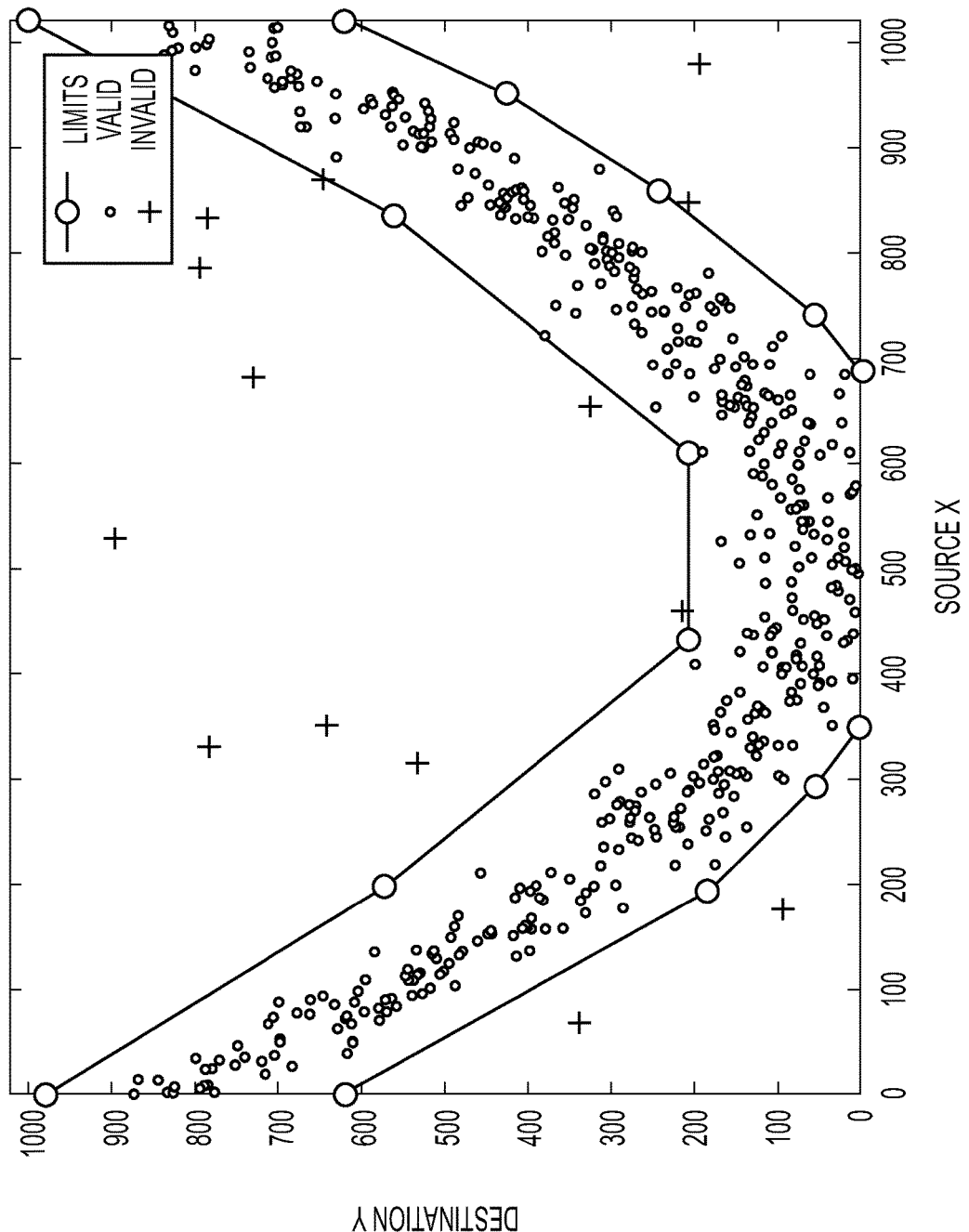
FIG. 11 depicts an example of non-linear relationship according to some embodiments.
Figure 12:
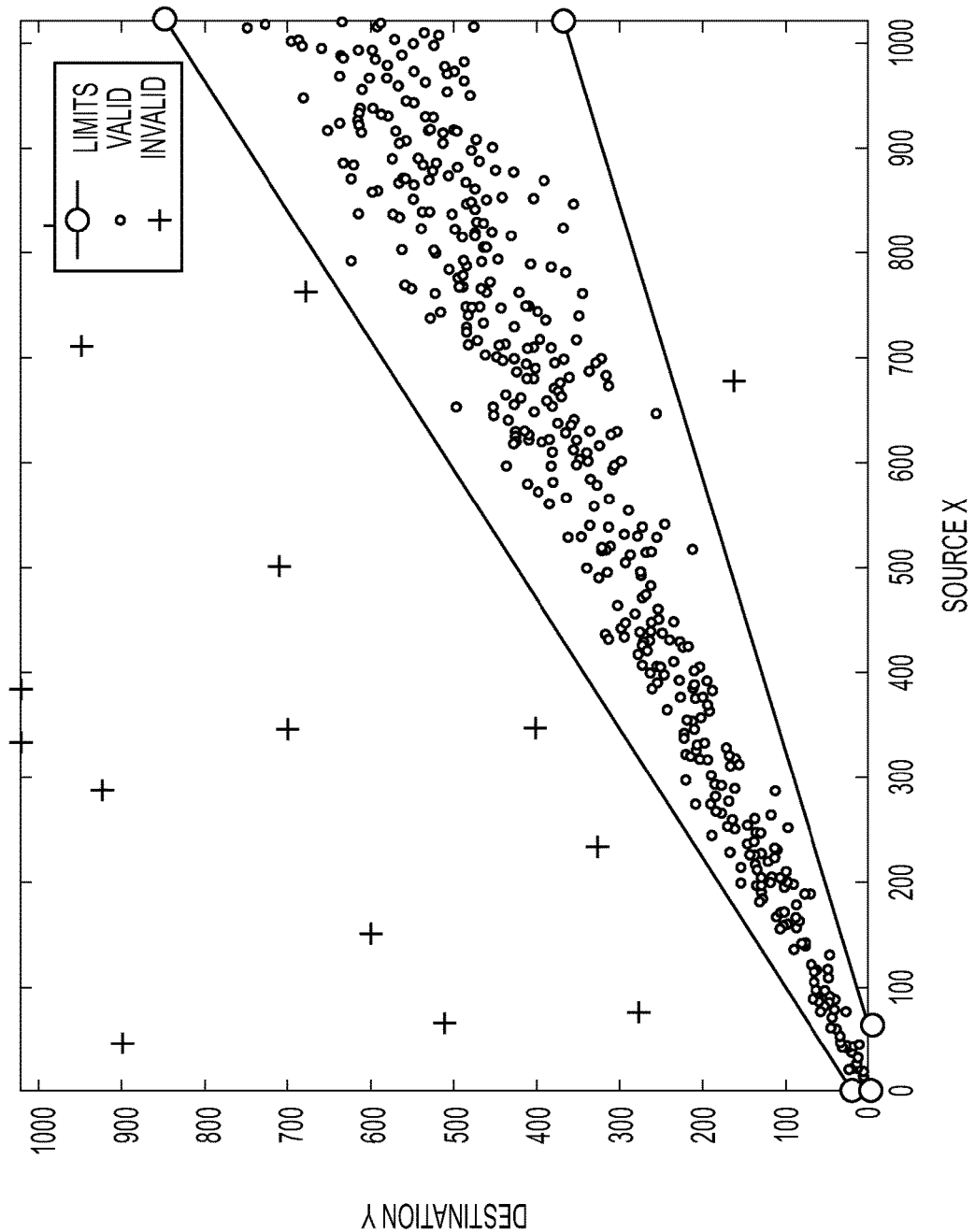
FIG. 12 depicts an example of unusual bounds according to some embodiments.

As another example, a piece-wise linear signal correlation algorithm may monitor signal pairs whose values are related, and alerts if the signals fall outside of the upper and lower correlation limits. This piece-wise linear signal correlation algorithm may be more general than the signal correlation algorithm in that this piece-wise linear signal correlation algorithm may use upper and lower limits defined by piece-wise-linear look-up functions. Table lookup may enable this piece-wise linear signal correlation algorithm to be applied to non-linear correlations, and correlations with unusual bounds. FIG. 11 depicts an example of non-linear relationship according to some embodiments. FIG. 12 depicts an example of unusual bounds according to some embodiments.

As another example, a signal forwarding algorithm may apply to signal pairs where a "destination" signal gets its value by being copied from a "source" signal by some process. The signal forwarding algorithm may check that the value of the destination signal is equal to a recent value of its source signal. The signal forwarding algorithm may handle cases where the source and destination may or may not be updated synchronously or even at the same period. Example cases may include: (i) a source signal from an incoming message (e.g. a message counter, command value, or request ID) is echoed in the response message as the destination signal, (ii) a destination signal sent out in a message originates from a source variable from an internal CPS computation, and (iii) a digitized analog measurement (source) is used as a variable (destination) in an internal CPS computation. The signal forwarding algorithm may runs upon each update of the destination signal, or periodically if the HEAD 104 cannot witness or keep up with each update.

A special case for the signal forwarding algorithm may be when the source signal changes before the algorithm runs, such that the destination signal is equal to an older source signal. To overcome this case the signal forwarding algorithm may use a buffer of recent source signals and timestamps.

Another special case for the signal forwarding algorithm may be when times where the source signal is not available and the destination take on a default value, or a value reserved for times when the source is not available.

As another example, an on period algorithm may monitors purely periodic messages for timing anomalies. The on period algorithm may alert if a message occurs off-period (e.g., too early or too late) as determined from timing jitter limits.

As yet another example, a message time algorithm may monitor pairs of messages that are tightly correlated in time and cardinality. The message time algorithm may run for each occurrence of the second message. The second message in the pair may quickly follow the first, and there can be only one of the second message following the first, and the second message may not occur without the first. An example may be when an acknowledgement message is sent by the CPS device 102 immediately following a command from the master controller. An example of a pseudo code for the message time algorithm is provided below

```
// compute time delta from source message
sdelta = currentMessageTimestamp - lastSourceMessageTimestamp
// forward delay check
if (sdelta > maxDelay)
    return error
// cardinality check
// compute time delta from last destination message
ddelta = currentMessageTimestamp - prevoiusMessageTimestamp
if (ddelta > sdelta)
    return success
// cardinality check failed
return error
```

The HEAD 104 may deployed onto the HC2 hardware 302 which may be added to the CPS device 102. Additionally, the HEAD 104 may intercept the network stream data and the file data from the various ports through an additional hardware that send these data to the HEAD 104 and the CPS controller 304. In some embodiments, HEAD 104 may be embedded software resident on each CPS device 102 (e.g. resident on each valve actuator) that monitors the device 102 for cyber-attacks.

In some embodiments, the HEAD may provide the following capabilities. While the CPS device 102 is operating, the HEAD 104 may monitors the device for behaviors that are indicative of an attack. The behaviors may include: (i) internal signals and device I/O that match the pattern of a known attack, (ii) "Anomalous" signals and I/O that violate bounds on normal behavior, and therefore could be a new form of attack, and/or (iii) "Anomalous" behavior of the main program on the CPS device, such as timing, or use of RAM. The HEAD 104 may scan the installed program and data files on the CPS device 102 for patterns that match a known attack. The HEAD 104 may perform these scans: before the HEAD is installed, at CPS device 102 startup, during maintenance, and/or as a background process during CPS device 102 operation. The HEAD 104 may record results to a log resident on the CPS device 102. The HEAD 104 may send notifications to outside recipients for critical events. The HEAD 104 may include detection, logging, notification capabilities controlled through configuration file(s). The HEAD 104 can improve over time through off-line analysis and updates to the configuration file(s).

As described above, HEAD 104 may be an embedded software residing on a CPS device 102 (e.g. a valve actuator) that monitors the CPS device 102 for malicious activities, communication, and potential threats. The HEAD 104 may monitor for known attacks, and for anomalous behavior indicative of a novel attacks. The HEAD 104 may use a combination of detection technologies such as machine learning, artificial intelligence, pattern matching, and customized algorithms. The HEAD 104 may improve over time through data collection and analytics.

As described herein, HEAD 104 may provide CPS device 102 users with benefits including, but not limited, to the following: (i) detect the presence of any known anomalous behavior in data/communication activity, (ii) detect novel forms of cyber-attack by monitoring for anomalous behavior, (iii) log security-related events for subsequent audits, (iii) generate notifications for critical security events, and (iv) configurable detection and notifications. In some embodiments, HEAD 104 may be usable on devices that require the ability to monitor and detect abnormalities in data or communication systems (e.g. avionics, actuators, controllers), thereby enabling such products to be securely connected.

Referring back to FIGS. 1 and 2, HEAD 104 may interact, either directly or indirectly, with the CPS device 102. The CPS device 102 may include a computing platform for the HEAD 104, and programs, communications, data, and machinery that may be monitored by the HEAD 104. In some embodiments, the CPS device 102 may be a valve actuator. In some instances, the valve actuator may be used in vehicle applications, such as ship applications. The computing platform for such valve actuators may be just two executables, e.g., bootloader and main program, running on a digital signal processor (DSP) with no operating system and minimal resources. Accordingly, the HEAD 104 may operate with constraints on RAM, flash, processing, logging, etc.

As shown in FIG. 2, HEAD 104 may interact, either directly or indirectly, with a CPS supplier 218. The CPS supplier 218 may be able to interact with the CPS device 102 locally, with degrees of visibility to the HEAD 104 that depends on the CPS device 102. For example, a CPS supplier 218 may be able to manually articulate some physical mechanism on the CPS device 102. As another example, the CPS device 102 may have an electronic user interface including a display, keys, switches, knobs, buttons, etc. In such instances, the CPS device 102 may primarily be a user-interaction device or the interface may be used for maintenance. As another example, CPS supplier 218 may be able to reset the CPS device 102, or cycle power. As yet another example, CPS supplier 218 may be able to change an operational mode of the CPS device 102. As another example, when the CPS device 102 is a valve actuator, the CPS supplier 218 may articulate the actuator using a manual hand wheel control. While the primary intent of the hand wheel may be a fallback when the actuator is non-functional, the wheel may be usable under any circumstances (healthy/ failed/degraded/unpowered, etc.). In some instances, the valve actuator may also include local user interface with a display, keys, switches, etc.

As shown in FIG. 2, the HEAD 104 may interact, either directly or indirectly, with the following external software. In some embodiments, the external software may include a CPS device startup process engine 212. The CPS device startup process engine 212 may be software on the CPS device 102 that starts software on the CPS device 102 when the CPS device 102 is powered on. In some embodiments, the external software may include a CPS device shutdown process engine 214. The CPS device shutdown process engine 214 may be software on the CPS device 102 that shuts down the CPS device 102. In some embodiments, the external software may include a CPS device update receiver, e.g., SOTA receiver. The CPS device update receiver may be software on the CPS device controller 304 that may receive and install updates to the software and/or configuration data on the CPS device 102. The update may be for the basic operation of the CPS device 102, or the security capabilities including the HEAD 104. In some embodiments, HEAD 104 may check an update for anomalies before installation. In some embodiments, the external software may include a CPS device notification receiver 210. The CPS device notification receiver 210 may be software on the CPS device 102 that manages notifications. Notifications generated from the HEAD 104 may be sent to the CPS device notification receiver 210. In some embodiments, the external software may include CPS device configuration interface port data 202. CPS device configuration interface port data 202 may be software that may be used to set the working parameters of the CPS device 102. HEAD 104 may monitor data captured CPS device configuration interface 202 for anomalies.

In some embodiments, HEAD 104 may interact, either directly or indirectly, with CPS device security logs 216, CPS device signals 208, CPS device program file 220, CPS device data file 222, CPS device LRU port data 204, and CPS device network port data 202. CPS device security logs 216 may be a file that records information about the CPS device 102 status and messages. HEAD 104 may send messages to CPS device security logs 216. CPS device program file 220 may include program file(s) pertaining to the software on the CPS device 102. HEAD 104 may monitors CPS device program file 220 for anomalies. CPS device data file 222 may include data file(s) of the program(s) on the CPS device 102. HEAD 104 monitors CPS device data file 222 for anomalies. CPS device signals 208 may be dynamically changing data in the CPS device 102 including inputs, outputs, intermediate results, commands, health. HEAD 104 may monitor CPS device signals 208 for anomalies. CPS device LRU port data 204 may be data from CPS device LRUs (line replaceable units) which may be replaceable parts of the CPS device 102. Such LRUs may impact the data monitored by HEAD 104 by: (i) noise, drift, and biases on the signals and commands being monitored, (ii) fault cases detected by BITE, or undetected, partial degradation, intermittent, or full failure, (iii), temporary disconnection and reconnection (e.g. during maintenance), (iv) replacement of an LRU with another LRU with slightly different characteristics, (v) replacement of an LRU with a counterfeit LRU, and/or (vi) replacement of an LRU with an attack device. CPS device network port data 202 may include a communication channel between the CPS device 102 and external systems. Head 104 may monitor data/communications through this channel.

As described herein, HEAD 104 may provide the following capabilities: (1) monitor network port communications for anomalous behavior, data, and known attacks, (2) monitor LRU port communications for anomalous behavior, data, and known attacks, (3) monitor configuration port communications for anomalous behavior, data, and known attacks, (4) monitor the behavior of programs in operation, (5) monitor CPU and RAM, (6) check software and configuration updates for anomalies and known attacks before installation, (7) log security-related data to support security audits, (8) send security notifications to the recipient specified in the configuration file, (9) send regular "alive" confirmations to the recipient specified in the configuration file, (10) use configuration files/parameters to control monitoring and notifications, and (11) learn and improve over time through analytics and configuration updates.

In some embodiments, the CPS supplier 208 may manually start and/or stop HEAD 104. In some embodiments, HEAD 104 may interact with the secure communications software on the CPS device 102 to monitor inputs and outputs from the network port, and LRU port. In some embodiments, HEAD 104 may interact with sensor management system software on the CPS device 102 to obtain access to sensor data that may not be available via the secure communications software. In some embodiments, HEAD 104 may interact with the CPS device update receiver (e.g., SOTA receiver) receiver software on the CPS device 102 to check updates before installation on the CPS device 102. In some embodiments, HEAD 104 may report results of the check to compete or abort the installation.

Figure 13:
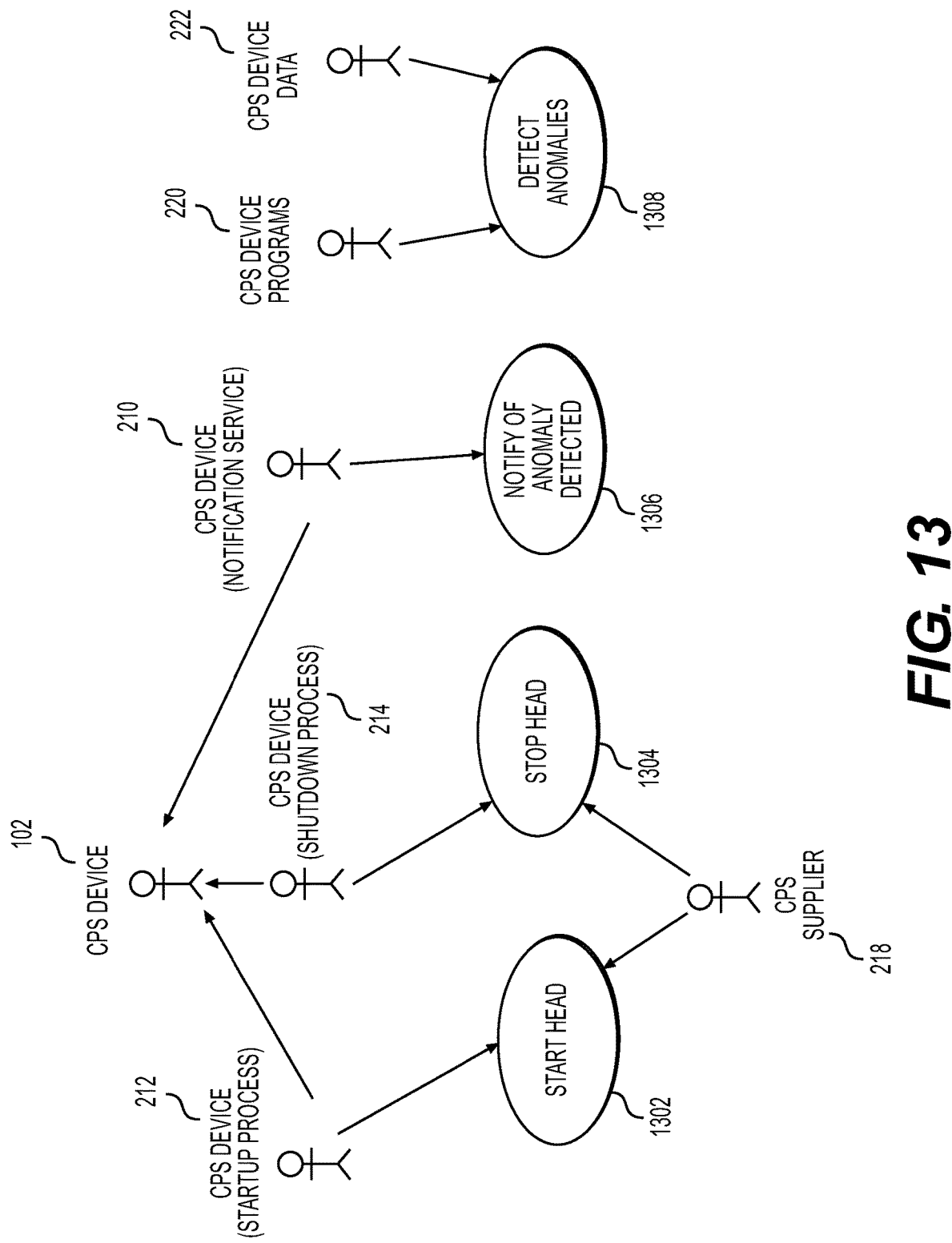
FIG. 13 depicts an example use case diagram according to some embodiments.

FIG. 13 depicts an example use case diagram that summarizes functional requirements for HEAD 104 according to some embodiments. The CPS supplier 218 may be a user who interacts with the CPS device 102 to perform factory setup or maintain the CPS device 102. Interactions between the CPS device 102 and the CPS supplier 218 may occur through use of HEAD 104. As shown in FIG. 13, the CPS supplier 218 may stop 1304 the HEAD 104 to perform an activity, e.g., maintenance. HEAD 104 may terminate all HEAD execution in response to a valid Stop HEAD command 1304. A list of valid sources of this command may include an authenticated CPS supplier 218 using a smart maintenance device (SMD) and a designated configuration port. HEAD 104 may not terminate execution in response a Stop HEAD command 1304 from any other source. HEAD may log each Stop HEAD command 1304, to include valid and invalid commands, and to include relevant parameters as required by security requirements described below.

The CPS supplier 218 may also start 1302 the HEAD 104. HEAD 104 may begin execution when started by a proper source. Proper sources may include an authenticated CPS supplier 218 using the SMD and the designated configuration port. HEAD 104 shall record each start to the logs, including relevant parameters as required by the security requirements described below.

CPS device 102 may be a cyber-physical system that hosts the HEAD 104. As shown in FIG. 13, CPS device 102 may start HEAD 104 when the CPS device 102 powers up, stop the HEAD 104 when the CPS device 102 powers down, restart HEAD 104 in the event of CPS device 102 restart, and restart HEAD 104 in the event HEAD 104 is no longer alive. CPS device 102 may include a startup process 212 to launch HEAD 104, a shutdown process 214 to stop HEAD 104, and a process that monitors the HEAD 104 and restarts the HEAD 104 if needed.

In some embodiments, HEAD 104 may send security notifications for a configurable set of conditions.

CPS device programs and data may include software, signals, I/O, files, and parameters that are resident on CPS device 102 and which the HEAD 104 monitors. CPS device 102 may have the following responsibilities with respect to the HEAD 104 monitoring: (i) expose signals and I/O for monitoring by the HEAD 104, and (ii) decrypt any encrypt files and messages as needed for monitoring by the HEAD 104.

As shown in FIG. 13, HEAD 104 may detects anomalies 1308. In some embodiments, HEAD 104 may monitor the CPS device 102 for cyberattacks including known attacks, and anomalous behavior indicative of a novel attack. The monitoring may include: (i) the HEAD checking installed files (e.g., software and data) for known attack patterns, (ii) the HEAD monitoring dynamic signals for known attack patterns, (iii) the HEAD monitoring dynamic signals for anomalous behavior indicative of an attack, (iv) the HEAD monitoring the dynamic signals on the CPS device 102, e.g., sensor signals, command signals, user interface signals, mode-related signals, signals internal to the program, network Port communications, LRU Port communications, configuration Port communications, (v) the HEAD monitoring program in operation, (vi) the HEAD monitoring RAM, (vii) the HEAD saving salient data to a log to support security audits and/or analytics to generate improvements to the HEAD 104, and (viii) the HEAD using configuration files/parameters to control its monitoring. As shown in FIG. 13, detected anomalies may be notified 1306.

As described herein, HEAD 104 may monitor signal data available on the CPS device 102 for anomalous behavior. Signal data may be data on the CPS device 102 that the HEAD 104 can access as individual values. Signal data may have limits on behavior in the time domain, such as nominal waveform shapes, nominal message periodicity, or relatively constant configuration values. Combinations of signals may have nominal boundaries in a multivariate space. Signal data may include the following, depending on the CPS device 102: (i) dynamic signals related to the functionality of the CPS device 102 (e.g. sensed values, commands, mode, internal bus I/O), (ii) dynamic signals related to the health monitoring of the CPS device 102 (e.g. health sensors, built-in-test results, etc.), (iii) dynamic signals to and from external interfaces (e.g. network traffic and data), (iv) end user inputs and outputs, (v) configuration setting values, (vi) signals and behaviors that are transient or mode-specific, such as startup, shutdown, steady-state operation, setup-mode, maintenance-mode, etc.

CPS file data may be data-aggregations installed on the CPS device 102. CPS file data may include: CPS firmware (e.g., a binary file), CPS Program(s) (e.g., an executable file), CPS configuration(s) (e.g., parameter values in supplier-specific format), CPS Instructions/Help (e.g., text/graphic files in in supplier-specific format), HEAD 104 Program(s) (e.g., executable file), and HEAD 104 configuration (e.g., supplier-specific format). HEAD 104 monitoring may cover the signal data and the file data available on the CPS device.

HEAD 104 may protect itself and its sensitive data and communications from accidental, malicious, or unauthorized access, use, modification, destruction, or disclosure. Security requirements implemented for security controls of the HEAD 104 may meet the NIST SP 800-53 requirements such that HEAD 104 meets moderator assurance impact level.

For example, technical moderate impact requirements from NIST SP 800-53 that shall be implemented by the HEAD 104 are provided in the table below.

| Number | Title | Description |
| --- | --- | --- |
| AC-4 | Information Flow Enforcement | The information system enforces approved authorizations for controlling the flow of information within the system and between interconnected systems in accordance with applicable policy. |
| AC-5 | Separation of Duties | The organization: Separates duties of individuals as necessary, to prevent malevolent activity without collusion; Documents separation of duties; and Implements separation of duties through assigned information system access authorizations. |
| AC-6 | Least Privilege | The organization employs the concept of least privilege, allowing only authorized accesses for users (and processes acting on behalf of users) which are necessary to accomplish assigned tasks in accordance with organizational missions and business functions. |
| AC-7 | Unsuccessful Login Attempts | The information system: Enforces a limit of [Assignment: organization-defined number] consecutive invalid login attempts by a user during a [Assignment: organization-defined time period]; and Automatically [Selection: locks the account/node for an [Assignment: organization-defined time period]; locks the account/node until released by an administrator; delays next login prompt according to [Assignment: organization-defined delay algorithm]] when the maximum number of unsuccessful attempts is exceeded. The control applies regardless of whether the login occurs via a local or network connection. |
| AC-8 | System Use Notification | The information system: Displays an approved system use notification message or banner before granting access to the system that provides privacy and security notices consistent with applicable federal laws, Executive Orders, directives, policies, regulations, standards, and guidance and states that: (i) users are accessing a U.S. Government information system; (ii) system usage may be monitored, recorded, and subject to audit; (iii) unauthorized use of the system is prohibited and subject to criminal and civil penalties; and (iv) use of the system indicates consent to monitoring and recording; Retains the notification message or banner on the screen until users take explicit actions to log on to or further access the information system; and For publicly accessible systems: (i) displays the system use information when appropriate, before granting further access; (ii) displays references, if any, |

| Number | Title | Description |
| --- | --- | --- |
| | | to monitoring, recording, or auditing that are consistent with privacy accommodations for such systems that generally prohibit those activities; and (iii) includes in the notice given to public users of the information system, a description of the authorized uses of the system. |
| AC-11 | Session Lock | The information system: Prevents further access to the system by initiating a session lock after [Assignment: organization-defined time period] of inactivity or upon receiving a request from a user; and Retains the session lock until the user reestablishes access using established identification and authentication procedures. |
| AC-18 | Wireless Access | The organization: Establishes usage restrictions and implementation guidance for wireless access; Monitors for unauthorized wireless access to the information system; Authorizes wireless access to the information system prior to connection; and Enforces requirements for wireless connections to the information system. |
| AU-2 | Auditable Events | The organization: Determines, based on a risk assessment and mission/business needs, that the information system must be capable of auditing the following events: [Assignment: organization-defined list of auditable events]; Coordinates the security audit function with other organizational entities requiring audit-related information to enhance mutual support and to help guide the selection of auditable events; Provides a rationale for why the list of auditable events are deemed to be adequate to support after-the-fact investigations of security incidents; and Determines, based on current threat information and ongoing assessment of risk, that the following events are to be audited within the information system: [Assignment: organization-defined subset of the auditable events defined in AU-2 a. to be audited along with the frequency of (or situation requiring) auditing for each identified event]. |
| AU-3 | Content of Audit Records | The information system produces audit records that contain sufficient information to, at a minimum, establish what type of event occurred, when (date and time) the event occurred, where the event occurred, the source of the event, the outcome (success or failure) of the event, and the identity of any user/subject associated with the event. |
| AU-4 | Audit Storage Capacity | The organization allocates audit record storage capacity and configures auditing to reduce the likelihood of such capacity being exceeded. |

In some embodiments, HEAD 104 may be designed such that it is certifiable to process and store United States military SECRET classification.

In some embodiments, HEAD 104 log file size may remain within limits appropriate for the CPS device 102, regardless of the number of events that occur between offloading logs from the CPS device 102.

In some embodiments, HEAD software may be designed to operate on CPS devices 102 and applications. Such CPS devices 102 and applications may include: compute platforms with no operating system, or a real-time operating system; compute platforms with limited RAM, flash, and CPU; platform-specific libraries and/or minimal libraries; high frequency signal rates (e.g. kHz); and specialized networks to monitor (e.g. Ethernet, Profibus, MIL-STD-1553, ARINC, CAN etc.).

In some embodiments, a CPS device 102 may be a small form factor device with limited compute resources. For example, the compute platform may be a DSP with no operating system with up to 32 kB of RAM, and 256 kB of flash. The libraries may be specific to the DSP. Software for the CPS device 102 may be written in C/C++ and uses platform-specific libraries. In some instances, the fastest signals may update at 20 kHz.

HEAD 104 may access CPS device 102 data to support development and tuning of any custom algorithms and training of machine learning-based algorithms. HEAD 104 may further access to CPS device 102 data in an on-going basis to continuously learn and improve the HEAD 104.

HEAD 104 may meet NIST RMF requirements such that the HEAD 104 is assessable and authorizable when integrated and deployed onto a system environment (e.g., an industrial plant).

Figure 14:
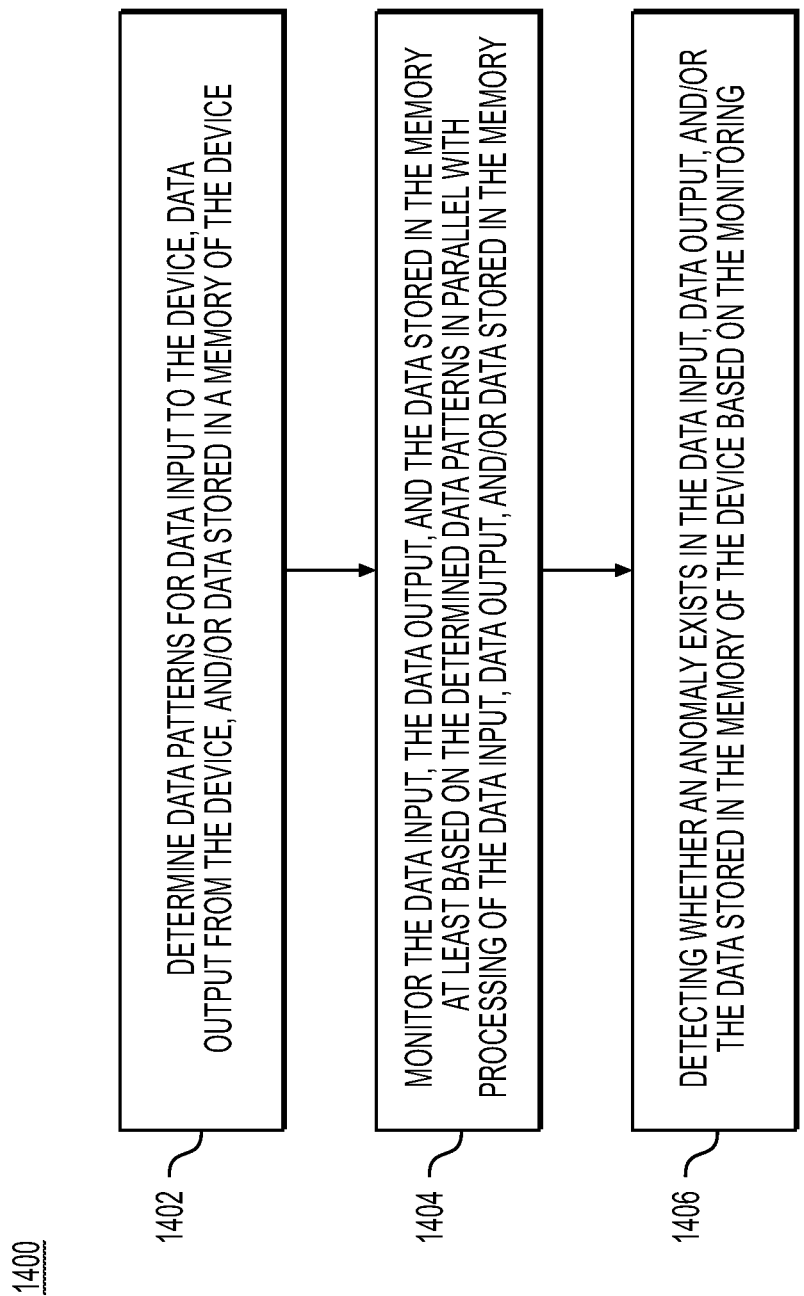
FIG. 14 depicts a flowchart of a method of detecting data anomalies on a device.

FIG. 14 depicts a flowchart of a method 1400 of detecting data anomalies on a device. In some embodiments, method 1400 may be performed by HEAD 104 as described herein.

Method 1400 may begin with step 1402 in which HEAD 104 may determine data patterns for data input to the device, e.g., CPS device 102, data output from the device, and/or data stored in a memory of the device. In some embodiments, the device may be a cyber-physical system device. In some embodiments, the data input may include network communication and/or configuration input to the device and the data output may include network communication and/or configuration output from the device. In some embodiments, the data input may include inputs from a line replaceable unit (LRU) to the device and the data output may include outputs to the LRU from the device, wherein the LRU is a component of the device.

In step 1404, HEAD 104 may monitor the data input, data output, and/or the data stored in the memory at least based on the determined data patterns in parallel with processing of the data input, data output, and/or the data stored in the memory. For example, the HEAD 104 may monitor the data input, data output, and/or the data stored in the memory in parallel with the device, e.g., CPS device 102, as the device processes the data input, data output, and/or the data stored in the memory. In some embodiments, monitoring the data stored in the memory of the device includes accessing the data stored in the memory of the cyber-physical system device, e.g., CPS device 102. In some embodiments, the determined data patterns may include a threshold amount of input and output data during a period of time. In such embodiments, monitoring the data input and data output may include determining whether the data input and data output during the period of time exceed the threshold amount. In some embodiments, the determined data patterns may include a threshold period of time between input data. In such embodiments, monitoring the data input may include detecting a first message received by the device; detecting a second message received by the device after a certain period of time; and comparing the certain period time to the threshold period of time.

In step 1406, HEAD 104 may detect whether an anomaly exists in the data input, data output, and/or the data stored in the memory of the device based on the monitoring. In some embodiments, HEAD 104 may determine that there is an anomaly if the data input and data output during the period of time exceed the threshold amount. In some embodiments, HEAD 104 may determine that there is an anomaly if the certain period time exceeds the threshold period of time.

Figure 15:
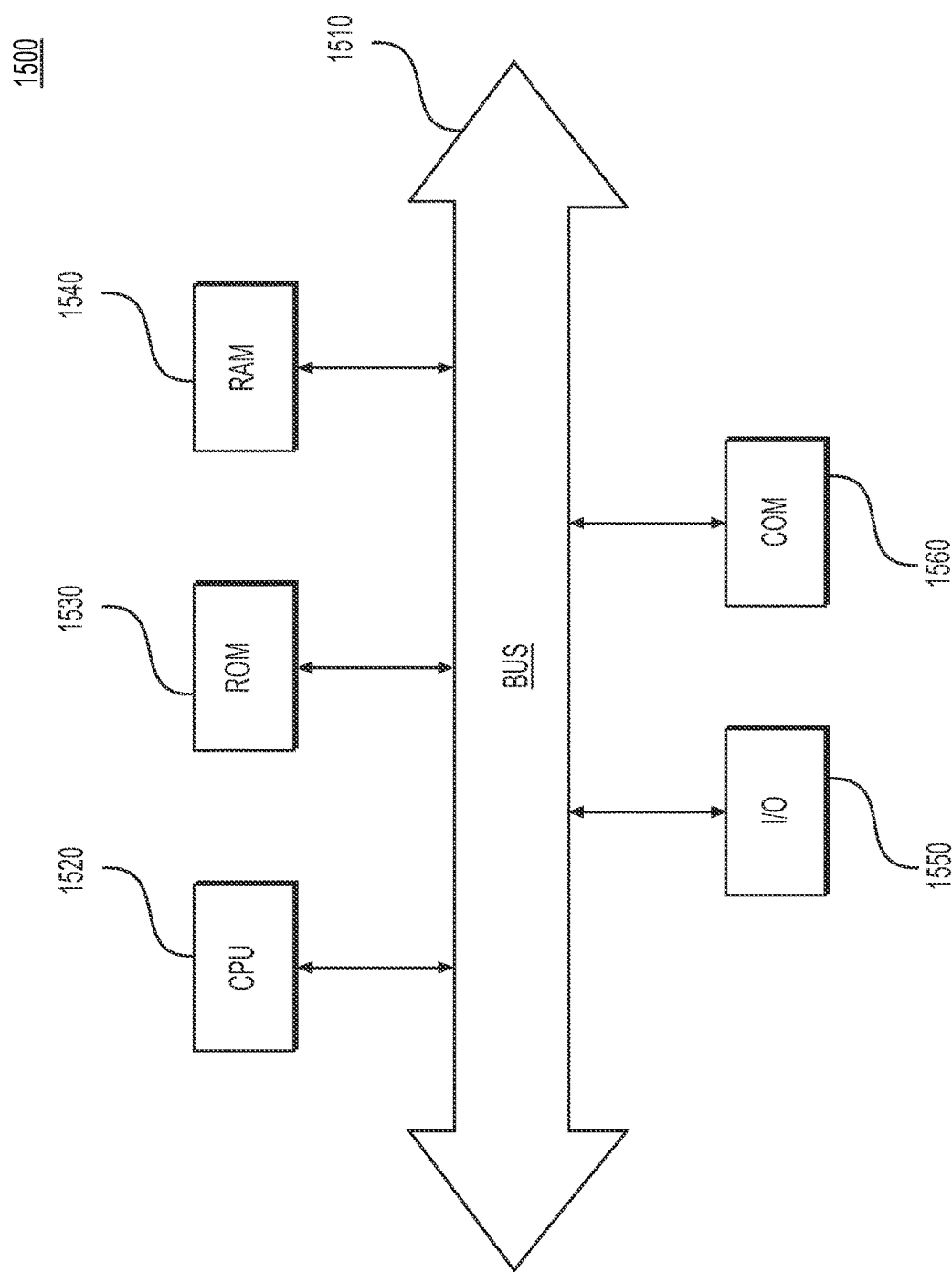
FIG. 15 depicts an exemplary computer device or system, in which embodiments of the present disclosure, or portions thereof, may be implemented.

FIG. 15 depicts an exemplary computer device or system, in which embodiments of the present disclosure, or portions thereof, may be implemented. Each of the computing system(s), databases, user interfaces, and methods described above with respect to FIGS. 1-14 can be implemented via device 1500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-14.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-14, may be implemented using device 1500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 15, device 1500 may include a central processing unit (CPU) 1520. CPU 1520 may be any type of processor device including, for example, any type of special purpose or a general-purpose microprocessor device. As will be appreciated by persons skilled in the relevant art, CPU 1520 also may be a single processor in a multi-core/multi-processor system, such system operating alone, or in a cluster of computing devices operating in a cluster or server farm. CPU 1520 may be connected to a data communication infrastructure 1510, for example, a bus, message queue, network, or multi-core message-passing scheme.

Device 1500 also may include a main memory 1540, for example, random access memory (RAM), and also may include a secondary memory 1530. Secondary memory 1530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1530 may include other similar means for allowing computer programs or other instructions to be loaded into device 1500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 1500.

Device 1500 also may include a communications interface ("COM") 1560. Communications interface 1560 allows software and data to be transferred between device 1500 and external devices. Communications interface 1560 may include a modem, a network interface (such as an Ethernet card), a communications port, a PCMCIA slot and card, or the like. Software and data transferred via communications interface 1560 may be in the form of signals, which may be electronic, electromagnetic, optical, or other signals capable of being received by communications interface 1560. These signals may be provided to communications interface 1560 via a communications path of device 1500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 1500 also may include input and output ports 1550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for detecting data anomalies on a device in communication with an embedded computing platform, the method comprising:
   determining, by one or more processors running on the embedded computing platform of the device, data patterns for data input to the device, data output from the device, and/or data stored in a memory of the device, wherein the data patterns comprise: a first data pattern delineating a set of boundaries for normal behavioral operation and a second data pattern comprising one or more pre-defined activity sequences associated with a known attack form, and wherein the device actuates a functionality of a vehicle component;
   monitoring, by the one or more processors, the data input, the data output, and the data stored in the memory at least based on the determined data patterns in parallel with processing of the data input, the data output, and/or the data stored in the memory, by monitoring command messages transmitted to the device for controlling how the functionality of the component is actuated by the device;
   detecting, based on the monitoring and by the one or more processors, whether an anomaly exists in the data input, the data output, and/or the data stored in the memory based on the monitoring, wherein the detecting comprises determining whether detected behavior of the command messages transmitted to the device falls outside the set of boundaries and/or whether detected sequences of an activity occurring on the device correspond to the one or more pre-defined activity sequences;
   recording, responsive to detecting that the anomaly exists in the data input, the data output, and/or the data stored in the memory, details associated with the anomaly in a database of the embedded computing platform; and
   selectively transmitting, in an alert notification, the details associated with the anomaly to a security service based on the command messages associated with the anomaly.

2. The computer-implemented method of claim 1, wherein the device is a cyber-physical system (CPS) device.

3. The computer-implemented method of claim 2, wherein the monitoring the data stored in the memory of the device includes accessing the data stored in the memory of the CPS device.

4. The computer-implemented method of claim 1, wherein the data input includes network communication and/or configuration input to the device and the data output includes network communication and/or configuration output from the device.

5. The computer-implemented method of claim 1, wherein the data input includes inputs from a line replaceable unit (LRU) to the device and the data output includes outputs to the LRU from the device, wherein the LRU is a component of the device.

6. The computer-implemented method of claim 1, wherein the determined data patterns include a threshold amount of input and output data during a period of time, and wherein the monitoring the data input and data output includes determining whether the data input and data output during the period of time exceed the threshold amount.

7. The computer-implemented method of claim 1, wherein the determined data patterns include a threshold period of time between input data, and wherein the monitoring the data input includes:

detecting a first message received by the device;
detecting a second message received by the device after a certain period of time; and
comparing the certain period time to the threshold period of time.

8. A system for detecting data anomalies on a device in communication with an embedded computing platform, the system comprising:
a memory of the computing platform storing instructions; and
a processor of the computing platform executing the instructions to perform a process, the process including:
determining data patterns for data input to the device, data output from the device, and/or data stored in a memory of the device, wherein the data patterns comprise: a first data pattern delineating a set of boundaries for normal behavioral operation and a second data pattern comprising one or more pre-defined activity sequences associated with a known attack form, and wherein the device actuates a functionality of a vehicle component;
monitoring the data input, the data output, and the data stored in the memory of the device at least based on the determined data patterns in parallel with processing of the data input, the data output, and/or the data stored in the memory of the device, by monitoring command messages transmitted to the device for controlling how the functionality of the component is actuated by the device;
detecting, based on the monitoring, whether an anomaly exists in the data input, the data output, and/or the data stored in the memory of the device based on the monitoring, wherein the detecting comprises determining whether detected behavior of the command messages provided to the device falls outside the set of boundaries and/or whether detected sequences of an activity occurring on the device correspond to the one or more pre-defined activity sequences;
recording, responsive to detecting that the anomaly exists in the data input, the data output, and/or the data stored in the memory, details associated with the anomaly in a database of the embedded computing platform; and
selectively transmitting, in an alert notification, the details associated with the anomaly to a security service based on the command messages associated with the anomaly.

9. The system of claim 8, wherein the device is a cyber-physical system (CPS) device.

10. The system of claim 9, wherein the monitoring the data stored in the memory of the device includes accessing the data stored in the memory of the CPS device.

11. The system of claim 8, wherein the data input includes network communication and/or configuration input to the device and the data output includes network communication and/or configuration output from the device.

12. The system of claim 8, wherein the data input includes inputs from a line replaceable unit (LRU) to the device and the data output includes outputs to the LRU from the device, wherein the LRU is a component of the device.

13. The system of claim 8, wherein the determined data patterns include a threshold amount of input and output data during a period of time, and wherein the monitoring the data input and data output includes determining whether the data input and data output during the period of time exceed the threshold amount.

14. The system of claim 8, wherein the determined data patterns include a threshold period of time between input data, and wherein the monitoring the data input includes:
detecting a first message received by the device;
detecting a second message received by the device after a certain period of time; and
comparing the certain period time to the threshold period of time.

15. A non-transitory computer-readable medium,
the non-transitory computer-readable medium storing instructions that, when executed by a processor of a computing platform embedded on a device, cause the processor to perform a method for detecting data anomalies on the device, the method comprising:
determining data patterns for data input to the device, data output from the device, and/or data stored in a memory of the device, wherein the data patterns comprise: a first data pattern delineating a set of boundaries for normal behavioral operation and a second data pattern comprising one or more pre-defined activity sequences associated with a known attack form, and wherein the device actuates a functionality of a vehicle component;
monitoring the data input, the data output, and the data stored in the memory of the device at least based on the determined data patterns in parallel with processing of the data input, the data output, and/or the data stored in the memory of the device, by monitoring command messages transmitted to the device for controlling how the functionality of the component is actuated by the device;
detecting, based on the monitoring, whether an anomaly exists in the data input, the data output, and/or the data stored in the memory of the device based on the monitoring, wherein the detecting comprises determining whether detected behavior of the command messages provided to the device falls outside the set of boundaries and/or whether detected sequences of an activity occurring on the device correspond to the one or more pre-defined activity sequences;
recording, responsive to detecting that the anomaly exists in the data input, the data output, and/or the data stored in the memory, details associated with the anomaly in a database of the embedded computing platform; and
selectively transmitting, in an alert notification, the details associated with the anomaly to a security service based on the command messages associated with the anomaly.

16. The non-transitory computer-readable medium of claim 15, wherein the device is a cyber-physical system device, and wherein the monitoring the data stored in the memory of the device includes accessing the data stored in the memory of the cyber-physical system device.

17. The non-transitory computer-readable medium of claim 15, wherein the data input includes network communication and/or configuration input to the device and the data output includes network communication and/or configuration output from the device.

18. The non-transitory computer-readable medium of claim 15, wherein the data input includes inputs from a line replaceable unit (LRU) to the device and the data output includes outputs to the LRU from the device, wherein the LRU is a component of the device.

19. The non-transitory computer-readable medium of claim 15, wherein the determined data patterns include a threshold amount of input and output data during a period of time, and wherein the monitoring the data input and data output includes determining whether the data input and data output during the period of time exceed the threshold amount.

20. The non-transitory computer-readable medium of claim 15, wherein the determined data patterns include a threshold period of time between input data, and wherein the monitoring the data input includes:
    detecting a first message received by the device;
    detecting a second message received by the device after a certain period of time; and
    comparing the certain period time to the threshold period of time.

* * * * *